US012736958B2

(12) United States Patent
Yang et al.

(10) Patent No.: US 12,736,958 B2
(45) Date of Patent: Sep. 15, 2026

(54) MULTI-SOURCE DATA FUSION METHOD AND SYSTEM FOR DYNAMIC SYSTEM SCENARIO BEHAVIOR DEDUCTION AND RELIABILITY PREDICTION ANALYSIS

(71) Applicant: SOUTH CHINA UNIVERSITY OF TECHNOLOGY, Guangzhou (CN)

(72) Inventors: Jun Yang, Guangzhou (CN); Chenyu Jiang, Guangzhou (CN); Ke Xue, Guangzhou (CN)

(73) Assignee: SOUTH CHINA UNIVERSITY OF TECHNOLOGY, Guangzhou (CN)

( * ) Notice: Subject to any disclaimer, the term of this patent is extended or adjusted under 35 U.S.C. 154(b) by 357 days.

(21) Appl. No.: 18/694,425

(22) PCT Filed: Mar. 30, 2023

(86) PCT No.: PCT/CN2023/084973
§ 371 (c)(1),
(2) Date: Mar. 22, 2024

(87) PCT Pub. No.: WO2023/221660
PCT Pub. Date: Nov. 23, 2023

(65) Prior Publication Data

US 2024/0393777 A1 Nov. 28, 2024

(30) Foreign Application Priority Data

May 16, 2022 (CN) ........................ 202210530304.3

(51) Int. Cl.
*G05B 23/02* (2006.01)

(52) U.S. Cl.
CPC ................................ *G05B 23/0254* (2013.01)

(58) Field of Classification Search
None
See application file for complete search history.

(56) References Cited

U.S. PATENT DOCUMENTS

2005/0049830 A1 3/2005 Kouritzin

FOREIGN PATENT DOCUMENTS

| | | |
|---|---|---|
| CN | 106950850 | 7/2017 |
| CN | 109492256 | 3/2019 |
| CN | 115081184 | 9/2022 |

OTHER PUBLICATIONS

Medeiros, Jose Antonio Carlos Canedo, and Roberto Schirru. "Identification of nuclear power plant transients using the Particle Swarm Optimization algorithm." Annals of Nuclear Energy 35, No. 4 (2008): 576-582. (Year: 2008).*

(Continued)

*Primary Examiner* — Ryan A Jarrett
(74) *Attorney, Agent, or Firm* — JCIPRNET

(57) ABSTRACT

The present invention discloses a multi-source data fusion method and system for dynamic system scenario behavior deduction and reliability prediction analysis, a computer device, and a storage medium. Based on a Markov/CCMT dynamic reliability prediction analysis method and combined with a multi-source data fusion and assimilation method, the method simulates and statistically analyzes complex dynamic behavior characteristics of digital process control with strong interactive coupling, nonlinearity and high uncertainty by Monte Carlo probability model random sampling, and then achieves forward deduction analysis and reliability prediction of a system operation state through dynamic search analysis of a system state transition probability matrix model.

14 Claims, 8 Drawing Sheets

(56) References Cited

OTHER PUBLICATIONS

Alamaniotis, Miltiadis, and Mauro Cappelli. "Intelligent identification of boiling water reactor state utilizing relevance vector regression models." Journal of Nuclear Engineering and Radiation Science 4, No. 2 (2018): 020904. (Year: 2018).*

English Translation of Yang et al. CN109492256A (Year: 2019).*

"International Search Report (Form PCT/ISA/210) of PCT/CN2023/084973", mailed on Jun. 16, 2023, with English translation thereof, pp. 1-6.

Jun Yang et al., "Markov/CCMT: Towards an integrated platform for dynamic reliability and risk analysis", Process Safety and Environmental Protection, vol. 155, Sep. 2021, pp. 498-517.

* cited by examiner

| Deduction depth | | | | | | | | | |
|---|---|---|---|---|---|---|---|---|---|
| $n=1$ | | $n=2$ | | $n=3$ | | $n=4$ | | $n=5$ | |
| System state evolution | Occurrence probability | System state evolution | Occurrence probability | System state evolution | Occurrence probability | System state evolution | Occurrence probability | System state evolution | Occurrence probability |
| [1, 1, 1, 1, 1, 3] | 0.973628794 | [1, 1, 1, 1, 1, 3] | 0.988604186 | [1, 1, 1, 1, 1, 3] | 0.945811831 | [1, 1, 1, 1, 1, 3] | 0.929246962 | [1, 1, 1, 1, 1, 3] | 0.914907226 |
| [2, 1, 1, 1, 1, 3] | 0.000292362 | [2, 1, 1, 1, 1, 3] | 0.00028784 | [1, 1, 1, 1, 1, 4] | 0.042182832 | [1, 1, 1, 1, 1, 4] | 0.061058652 | [1, 1, 1, 1, 1, 4] | 0.061022258 |
| [3, 1, 1, 1, 1, 3] | 0.000292362 | [3, 1, 1, 1, 1, 3] | 0.00028784 | [1, 1, 1, 1, 1, 5] | 0.000337836 | [1, 1, 1, 1, 1, 5] | 0.001040231 | [1, 1, 1, 1, 1, 5] | 0.001591474 |
| [4, 1, 1, 1, 1, 3] | 0.000292362 | [4, 1, 1, 1, 1, 3] | 0.00028784 | [1, 1, 1, 1, 2, 3] | 0.000850962 | [1, 1, 1, 1, 2, 3] | 0.00111761 | [1, 1, 1, 1, 1, 6] | 1.14E-05 |
| [1, 2, 1, 1, 1, 3] | 0.000292362 | [1, 2, 1, 1, 1, 3] | 0.00028784 | [1, 1, 1, 1, 3, 3] | 0.000850962 | [1, 1, 1, 1, 2, 4] | 1.25E-05 | [1, 1, 1, 1, 2, 3] | 0.001376074 |
| [1, 3, 1, 1, 1, 3] | 0.000292362 | [1, 3, 1, 1, 1, 3] | 0.00028784 | [1, 1, 1, 1, 4, 3] | 0.000850962 | [1, 1, 1, 1, 3, 3] | 0.00111761 | [1, 1, 1, 1, 2, 4] | 3.99E-05 |
| [1, 4, 1, 1, 1, 3] | 0.000292362 | [1, 4, 1, 1, 1, 3] | 0.00028784 | [1, 1, 1, 2, 1, 3] | 0.000850962 | [1, 1, 1, 1, 3, 4] | 1.25E-05 | [1, 1, 1, 1, 3, 3] | 0.001376074 |
| [1, 1, 2, 1, 1, 3] | 0.000292362 | [1, 1, 2, 1, 1, 3] | 0.00028784 | [1, 1, 1, 3, 1, 3] | 0.000850962 | [1, 1, 1, 1, 4, 3] | 0.00111761 | [1, 1, 1, 1, 3, 4] | 3.99E-05 |
| [1, 1, 3, 1, 1, 3] | 0.000292362 | [1, 1, 3, 1, 1, 3] | 0.00028784 | [1, 1, 1, 4, 1, 3] | 0.000850962 | [1, 1, 1, 1, 4, 4] | 1.25E-05 | [1, 1, 1, 1, 4, 3] | 0.001376074 |
| [1, 1, 4, 1, 1, 3] | 0.000292362 | [1, 1, 4, 1, 1, 3] | 0.00028784 | [1, 1, 2, 1, 1, 3] | 0.000850962 | [1, 1, 1, 2, 1, 3] | 0.00111761 | [1, 1, 1, 1, 4, 4] | 3.99E-05 |
| [1, 1, 1, 2, 1, 3] | 0.000292362 | [1, 1, 1, 2, 1, 3] | 0.00028784 | [1, 1, 3, 1, 1, 3] | 0.000850962 | [1, 1, 1, 2, 1, 4] | 1.25E-05 | [1, 1, 1, 2, 1, 3] | 0.001376074 |
| [1, 1, 1, 3, 1, 3] | 0.000292362 | [1, 1, 1, 3, 1, 3] | 0.00028784 | [1, 1, 4, 1, 1, 3] | 0.000850962 | [1, 1, 1, 3, 1, 3] | 0.00111761 | [1, 1, 1, 2, 1, 4] | 3.99E-05 |
| [1, 1, 1, 4, 1, 3] | 0.000292362 | [1, 1, 1, 4, 1, 3] | 0.00028784 | [1, 2, 1, 1, 1, 3] | 0.000850962 | [1, 1, 1, 3, 1, 4] | 1.25E-05 | [1, 1, 1, 3, 1, 3] | 0.001376074 |
| [1, 1, 1, 1, 2, 3] | 0.000292362 | [1, 1, 1, 1, 2, 3] | 0.00028784 | [1, 3, 1, 1, 1, 3] | 0.000850962 | [1, 1, 1, 4, 1, 3] | 0.00111761 | [1, 1, 1, 3, 1, 4] | 3.99E-05 |
| [1, 1, 1, 1, 3, 3] | 0.000292362 | [1, 1, 1, 1, 3, 3] | 0.00028784 | [1, 4, 1, 1, 1, 3] | 0.000850962 | [1, 1, 1, 4, 1, 4] | 1.25E-05 | [1, 1, 1, 4, 1, 3] | 0.001376074 |
| [1, 1, 1, 1, 4, 3] | 0.000292362 | [1, 1, 1, 1, 4, 3] | 0.00028784 | [2, 1, 1, 1, 1, 3] | 0.000850962 | [1, 1, 2, 1, 1, 3] | 0.00111761 | [1, 1, 1, 4, 1, 4] | 3.99E-05 |
| [1, 1, 1, 1, 1, 4] | 0.021879899 | [1, 1, 1, 1, 1, 4] | 0.010681188 | [3, 1, 1, 1, 1, 3] | 0.000850962 | [1, 1, 2, 1, 1, 4] | 1.25E-05 | [1, 1, 2, 1, 1, 3] | 0.001376074 |
| | | [2, 1, 1, 1, 1, 3] | 0.0002881 | [4, 1, 1, 1, 1, 3] | 0.000850962 | [1, 1, 3, 1, 1, 3] | 0.00111761 | [1, 1, 2, 1, 1, 4] | 3.99E-05 |
| | | [3, 1, 1, 1, 1, 3] | 0.0002881 | | | [1, 1, 3, 1, 1, 4] | 1.25E-05 | [1, 1, 3, 1, 1, 3] | 0.001376074 |
| | | [4, 1, 1, 1, 1, 3] | 0.0002881 | | | [1, 1, 4, 1, 1, 3] | 0.00111761 | [1, 1, 3, 1, 1, 4] | 3.99E-05 |
| | | [1, 2, 1, 1, 1, 3] | 0.0002881 | | | [1, 1, 4, 1, 1, 4] | 1.25E-05 | [1, 1, 4, 1, 1, 3] | 0.001376074 |
| | | [1, 3, 1, 1, 1, 3] | 0.0002881 | | | [1, 2, 1, 1, 1, 3] | 0.00111761 | [1, 1, 4, 1, 1, 4] | 3.99E-05 |
| | | [1, 4, 1, 1, 1, 3] | 0.0002881 | | | [1, 2, 1, 1, 1, 4] | 1.25E-05 | [1, 2, 1, 1, 1, 3] | 0.001376074 |
| | | [1, 1, 2, 1, 1, 3] | 0.0002881 | | | [1, 3, 1, 1, 1, 3] | 0.00111761 | [1, 2, 1, 1, 1, 4] | 3.99E-05 |
| | | [1, 1, 3, 1, 1, 3] | 0.0002881 | | | [1, 3, 1, 1, 1, 4] | 1.25E-05 | [1, 3, 1, 1, 1, 3] | 0.001376074 |
| | | [1, 1, 4, 1, 1, 3] | 0.0002881 | | | [1, 4, 1, 1, 1, 3] | 0.00111761 | [1, 3, 1, 1, 1, 4] | 3.99E-05 |
| | | [1, 1, 1, 2, 1, 3] | 0.0002881 | | | [1, 4, 1, 1, 1, 4] | 1.25E-05 | [1, 4, 1, 1, 1, 3] | 0.001376074 |
| | | [1, 1, 1, 3, 1, 3] | 0.0002881 | | | [2, 1, 1, 1, 1, 3] | 0.00111761 | [1, 4, 1, 1, 1, 4] | 3.99E-05 |
| | | [1, 1, 1, 4, 1, 3] | 0.0002881 | | | [2, 1, 1, 1, 1, 4] | 1.25E-05 | [2, 1, 1, 1, 1, 3] | 0.001376074 |
| | | [1, 1, 1, 1, 2, 3] | 0.0002881 | | | [3, 1, 1, 1, 1, 3] | 0.00111761 | [2, 1, 1, 1, 1, 4] | 3.99E-05 |
| | | [1, 1, 1, 1, 3, 3] | 0.0002881 | | | [3, 1, 1, 1, 1, 4] | 1.25E-05 | [3, 1, 1, 1, 1, 3] | 0.001376074 |
| | | [1, 1, 1, 1, 4, 3] | 0.0002881 | | | [4, 1, 1, 1, 1, 3] | 0.00111761 | [3, 1, 1, 1, 1, 4] | 3.99E-05 |
| | | [1, 1, 1, 1, 1, 4] | 0.021541867 | | | [4, 1, 1, 1, 1, 4] | 1.25E-05 | [4, 1, 1, 1, 1, 3] | 0.001376074 |
| | | [1, 1, 1, 1, 1, 5] | 0.000239352 | | | | | [4, 1, 1, 1, 1, 4] | 3.99E-05 |
| System failure probability: 0 | | System failure probability: 0 | | System failure probability: 0 | | System failure probability: 0 | | System failure probability: 0 | |

FIG. 7

MULTI-SOURCE DATA FUSION METHOD AND SYSTEM FOR DYNAMIC SYSTEM SCENARIO BEHAVIOR DEDUCTION AND RELIABILITY PREDICTION ANALYSIS

CROSS-REFERENCE TO RELATED APPLICATION

This application is a 371 of international application of PCT application serial no. PCT/CN2023/084973, and filed on Mar. 30, 2023, which claims priority benefit of Chinese Patent Application No. 202210530304.3, and filed on May 16, 2022. The entirety of each of the above mentioned patent applications is hereby incorporated by reference herein and made a part of this specification.

TECHNICAL FIELD

The present invention belongs to the field of simulation and dynamic reliability safety analysis of complex digital process control systems, and particularly relates to a multi-source data fusion method and system for dynamic system scenario behavior deduction and reliability prediction analysis, a computer device, and a storage medium.

BACKGROUND

In recent years, all industries are in the process of digital transformation, and even the nuclear industry system, which is less sensitive to emerging technologies, is opening up to digital technology upgrades and comprehensive applications. With the rapid development of digital intelligent sensing technology, distributed communication network technology and computer technology, nuclear power has also ushered in the era of big data. Digital instrumentation and control systems, as the nerve center of nuclear power plants, are vital to the operational safety of nuclear power plants. However, while the technological upgrade of advanced digital systems in nuclear power plants brings obvious superiority, system verification and validation and system dynamic reliability safety analysis become complex and difficult due to a series of problems such as strong interaction dynamic characteristics of the systems, embedding of software control algorithms and strong coupling correlation between system components. The U.S. Nuclear Regulatory Commission (NRC) is the first nuclear power regulator to conduct research on reliability prediction analysis methods of digital instrumentation and control systems and software thereof of nuclear power plants. Through the benchmark system comparison analysis, it is pointed out that traditional static fault tree/event tree analysis methods may not effectively achieve the dynamic reliability modeling and risk analysis of digital instrumentation and control systems, and new dynamic reliability prediction analysis methods or integrated class methods must be sought to achieve the reliability modeling and comprehensive safety analysis of digital instrumentation and control systems with multiple composite characteristics such as complex dynamic interaction processes, multi-state, non-linear, time-series and high uncertainty.

At present, the research on new dynamic reliability and risk evaluation methods mainly focuses on a dynamic fault tree/event tree, Markov/CCMT, dynamic flowgraph methodology (DFM), Bayesian belief network, Petri net, Monte Carlo simulation, etc. However, due to the high complexity of digital process control systems, the progress of related technology research is slow, many methods generally have the bottleneck problem of computational complexity, and the theoretical research of related algorithms still stays at the stage of simple case system demonstration and description, which is difficult to expand the application to dynamic reliability and safety evaluation of large complex systems.

SUMMARY

Aiming at the practical problems such as difficulty in accurate modeling and efficient calculation of a dynamic interaction process of large complex nonlinear digital control systems, the present invention provides a multi-source data fusion method and system for dynamic system scenario behavior deduction and reliability prediction analysis, a computer device, and a storage medium. Through self-updating construction of a system state transition probability mapping matrix model after data assimilation and combined dimension reduction of system state points, the uncertainty in a simulation process of system dynamic behaviors may be effectively eliminated, the modeling accuracy and matrix space search efficiency may be improved, and advance prediction of the system scenario behaviors and dynamic reliability prediction may be achieved for guidance of operation safety of nuclear power plants.

A first object of the present invention is to provide a multi-source data fusion method for dynamic system scenario behavior deduction and reliability prediction analysis.

A second object of the present invention is to provide a multi-source data fusion system for dynamic system scenario behavior deduction and reliability prediction analysis.

A third object of the present invention is to provide a computer device.

A fourth object of the present invention is to provide a storage medium.

The first object of the present invention may be implemented by adopting the following technical solutions:

A multi-source data fusion method for dynamic system scenario behavior deduction and reliability prediction analysis includes:

- obtaining a particle swarm distribution of an assimilated initial system state by Gaussian sampling according to system state initial value input or assumption, importing the particle swarm distribution to a system simulation model to simulate a trajectory change of a particle swarm, obtaining a posteriori distribution of the particle swarm of a system state at the current moment by data assimilation in combination with real-time monitoring input of the system state, and using the posteriori distribution as a particle swarm distribution of an assimilated initial system state at the next moment;
- determining, based on a range of the posteriori distribution of the particle swarm of the system state at the current moment obtained during data assimilation, an upper boundary value and a lower boundary value of a system state originating cell, using the upper boundary value and the lower boundary value as a new cell scale for discrete partition of a system state space, and completing reconstruction of a system state space model by digital coding;
- performing uniform sampling on the system state originating cell to obtain a swarm distribution of system dynamic behavior deduction initial state particle, importing system dynamic behavior deduction initial state particle swarms into the system simulation model to simulate a trajectory change of the extracted particle swarms, obtaining a conditional transition probability matrix of a system state under a current system configuration based on statistical estimation of a number of particle swarms falling into different cells, and obtaining a Markov/CCMT system state transition probability mapping matrix model by combining the conditional transition probability matrix with a system physical component state transition probability matrix;

performing, based on the constructed Markov/CCMT system state transition probability mapping matrix model, system state advance prediction analysis through a system state scenario behavior dynamic deduction algorithm, to further merge the same system states, pushing an exclusive system state obtained after merging and reduction into a search sequence structure, and repeatedly performing processes of construction updating and iterative search of the Markov/CCMT system state transition probability mapping matrix model until reaching a specified search depth; and ranking, based on occurrence probabilities of the merged system states, predicted system state scenario sequence dynamic evolution and development, and displaying graphically through an interface to guide safe operation of the system.

Further, a system configuration structure is configured based on system equipment real-time state monitoring input, and the search sequence structure is constructed based on a configured initialized extended system state, where the extended system state includes a system state and an adjoint parameter of the system state, a state of the adjoint parameter is an associated system parameter of a change of the system state, and the system state, the adjoint parameter of the system state and a system physical component state are coupled to each other without directly affecting dynamic behavior characteristics of the system, and are indirectly reflected through an influence on the change of the system state.

Further, the system state scenario behavior dynamic deduction algorithm includes:

taking the assimilated system state at the current moment and an adjoint parameter of the assimilated system state as a system state originating point, adding the system state originating point to the search sequence structure, and meanwhile, initializing parameters of a probability of an initial system state, a search depth, a time step;

extracting system states in the search sequence structure one by one, searching for non-zero elements in the Markov/CCMT system state transition probability mapping matrix model subjected to assimilation and update of the system state to obtain the next transition point of the system state, an occurrence probability of a transition sequence path of each system state being obtained by probability calculation in the search process, and setting a pre-truncation criterion during transition of each step of the system state as needed;

after each traversal of the system states in the search sequence structure is completed, merging system state transition sequence paths with the same final state, and adding a merged system state to the search sequence structure as a new parent node for the next iterative search; and for each new parent node, reconstructing the Markov/CCMT system state transition probability mapping matrix model by Monte Carlo system state cell representative point random sampling, simulation and statistical analysis before proceeding to the next branch search of the system state transition sequence, so as to respond to a change of the adjoint parameter.

Further, according to the system state scenario behavior dynamic deduction algorithm, the same system state points are concentrated and merged after each iterative search step, thereby avoiding an exponential growth of a number of branches in the system state sequence during each iteration, preventing a number of the system state points from exceeding a size of the whole system state space, effectively reducing the system state search space, and significantly improving the search efficiency.

Further, during system state scenario behavior dynamic deduction, a potential transition of system states after each assimilation is subjected to evolution and development, and the occurrence probability of different system states after evolution is obtained by cumulative probability summation during each matrix iterative search, so as to achieve dynamic system reliability prediction analysis, including:

ranking predicted system states obtained from each iterative search by occurrence probabilities of the predicted system states through a list, where the greater a probability value, the greater the occurrence possibility of a system state; and transforming digital coding system state vectors subjected to integration and ranking in each search step into a common language description that can be understood by system operators, demonstrating a dynamic evolution process of the system states through a human-machine interface, and meanwhile, comparing the obtained system state failure probabilities with a system operation safety limit acceptable guideline to guide the safe operation of the system.

Further, for a complex nonlinear process control system, accurate analytical solutions are difficult to be obtained for the conditional transition probability matrix, and the system state transition probability mapping matrix model is obtained by statistical analysis of system state migration trajectory simulation and tracing through a system state sampling point movement and distribution accurate sampling method based on Monte Carlo simulation.

Further, the system state sampling point movement and distribution accurate sampling method includes:

determining, in combination with a particle filter-based data assimilation process, the initial system state position through system state monitoring input or assumption at an initial moment, performing Gaussian sampling on initial system state position points, and generating N particles around the system states and each variable in the adjoint parameter of the system states, the initial system state position points including the adjoint parameter of the initial system state position points;

importing the system states of and the adjoint parameters of the system state of sampled particles into the system simulation model to simulate and predict a particle trajectory change and a final value distribution of the particles;

reading system real-time state observation data, and completing weight value calculation and resampling of the simulated and predicted particles through a particle filter-based data assimilation algorithm; and reconstructing the system state space based on movement and distribution of the particle swarm after resampling, so as to simulate and reflect the system dynamic behavior characteristics more accurately.

Further, the method further includes a self-updating construction process of the Markov/CCMT system state transition probability mapping matrix model, system state scenario behavior fast deduction and dynamic reliability prediction analysis are realized by searching for coincidence elements in a current system state potential transition mapping relationship sub-matrix and integrating the same system states, and updating of the system physical component state transition probability matrix and updating of the conditional transition probability matrix are included, where for the updating of the system physical component state transition probability matrix, system equipment actual state monitoring is taken as input, and an irrelevant system configuration of the system physical component state transition probability matrix and a state transition mapping relationship of the irrelevant system configuration are subjected to annihilation and sparsification;

for the updating of the conditional transition probability matrix, system equipment actual state monitoring and system process variable state monitoring are taken as input, particle swarm uniform sampling is performed on a cell space where the assimilated and updated initial system state is located, and a particle swarm trajectory change is simulated on the system simulation model, a distribution of particle final value positions in the different cell spaces is counted, and a conditional transition probability of a system state under the current system configuration is approximatively estimated and updated by an equal-weight dot product method; and while completing the self-updating construction of the system state transition probability mapping matrix of this cycle, system state adjoint parameters of different falling cell representative points obtained from random sampling and simulated statistical analysis in the iterative search step of the cycle are averaged to adapt to reconstruction of the Markov/CCMT system state transition probability mapping matrix model in the next iterative search.

Further, a dynamic search range of the Markov/CCMT system state transition probability mapping matrix model Q is only limited to the potential transition mapping relationship sub-matrix of the current system state, that is, in the self-updating construction process of the Markov/CCMT system state transition probability mapping matrix model Q, only the conditional transition probability of the system state under the current system configuration is considered, and a conditional transition probability between other system states is automatically assigned to be 0, thereby reducing the complexity of the construction of the conditional transition probability matrix G, and only traversing and storing non-zero elements in the search process to improve a search speed.

The second object of the present invention may be implemented by adopting the following technical solution:

A multi-source data fusion system for dynamic system scenario behavior deduction and reliability prediction analysis includes:

a particle swarm distribution acquiring module, configured to: obtain, based on a system state spatio-temporal coupling model, a particle swarm distribution of an assimilated initial system state by Gaussian sampling according to system state initial value input or assumption, import the particle swarm distribution to a system simulation model to simulate a trajectory change of a particle swarm, obtain a posteriori distribution of a system state particle swarm at the current moment by data assimilation in combination with a real-time monitoring input of system state, and use the posteriori distribution as a particle swarm distribution of an assimilated initial system state at the next moment;

a system state space model reconstruction module, configured to: determine, based on a range of the posteriori distribution of the system state particle swarm at the current moment obtained during data assimilation, an upper boundary value and a lower boundary value of a system state originating cell, use the upper boundary value and the lower boundary value as a new cell scale for discrete partition of a system state space, and complete reconstruction of a system state space model by digital coding;

a Markov/CCMT system state transition probability mapping matrix model generation module, configured to: perform uniform sampling on the system state originating cell to obtain a distribution of a system dynamic behavior deduction initial state particle swarm, import the system dynamic behavior deduction initial state particle swarm into the system simulation model to simulate a trajectory change of the extracted particle swarm, obtain a conditional transition probability matrix of a system state under a current system configuration based on statistical estimation of a number of particle swarms falling into different cells, and obtain a Markov/CCMT system state transition probability mapping matrix model by combining the conditional transition probability matrix with a system physical component state transition probability matrix;

a system state scenario behavior dynamic deduction algorithm and reliability prediction analysis module, configured to: perform, based on the constructed Markov/CCMT system state transition probability mapping matrix model, system state advance prediction analysis through applying a system state scenario behavior dynamic deduction algorithm, to further merge the same system states, push an exclusive system state obtained after merging and reduction into a search sequence structure, and repeatedly perform processes of construction, updating and iterative search of the Markov/CCMT system state transition probability mapping matrix model until reaching a specified search depth; and a system analysis result displaying module, configured to rank, based on the occurrence probabilities of the merged system states, predicted system state scenario sequence dynamic evolution and development, and display graphically through an interface to guide safe operation of the system.

The third object of the present invention may be implemented by adopting the following technical solution:

A computer device includes a processor and a memory configured to store a program capable of being executed by the processor, and the processor, when executing the program stored in the memory, implements the above multi-source data fusion method for dynamic system scenario behavior deduction and reliability prediction analysis.

The fourth object of the present invention may be implemented by adopting the following technical solution:

A storage medium stores a program, and the program, when executed by a processor, implements the above multi-source data fusion method for dynamic system scenario behavior deduction and reliability prediction analysis.

Compared with the prior art, the present invention has the following beneficial effects:

1. According to the method provided by the present invention, on the basis of the existing equal-weight dot product method based on Monte Carlo simulation, a system state sampling point movement and distribution accurate sampling method based on data assimilation is designed, the cell structure of the system state space can be reshaped based on the posteriori distribution of the particle swarm of the assimilated system states and the adjoint parameters of the assimilated the system states, and the problem of sampling point deviation caused by fixed cell structure partition is avoided, so that the system dynamic behavior characteristics are described and predicted more accurately.

2. The method provided by the present invention incorporates multi-source data such as system simulation data, system real-time observation data, and equipment reliability characteristic data and so on, achieves more accurate mapping of the system states and the adjoint parameters of the system states by the particle filter-based data assimilation algorithm, and accurately predicts the system dynamic evolution process in combination with the generation and self-updating construction process of the system state probability mapping matrix model.

3. By means of the system state scenario behavior dynamic deduction algorithm based on matrix coding and the reliability prediction analysis method provided by the present invention, the improvement of low-dimensional sparsification of the high-dimensional system state space matrix model is achieved in the model construction process, the problem of explosions of the system state space is effectively suppressed by integration and conventionalization of the same system state points in the subsequent search and analysis process, the search efficiency is greatly improved, the requirements of advance/super real-time prediction analysis are met, and proactive safety guidelines can be provided for intelligent operation and maintenance of large complex safety systems such as nuclear power plants.

BRIEF DESCRIPTION OF ACCOMPANYING DRAWINGS

For clearer descriptions of the technical solutions according to the embodiments of the present invention or in the prior art, accompanying drawings that are to be referred for description of the embodiments or the prior art are briefly described hereinafter. Apparently, the accompanying drawings described hereinafter merely illustrate some embodiments of the present invention. A person of ordinary skill in the art may also derive other drawings based on the structures shown in the accompanying drawings described herein without any creative effort.

FIG. 7 shows system state evolution results under different search depths according to Embodiment 2 of the present invention.

DETAILED DESCRIPTION OF EMBODIMENTS

In order to make the objects, technical solutions and advantages of the embodiments of the present invention clearer, the technical solutions in the embodiments of the present invention will be described clearly and completely below in conjunction with the accompanying drawings in the embodiments of the present invention. Apparently, the described embodiments are some of the embodiments of the present invention, not all the embodiments, and based on the embodiments in the present invention, all other embodiments obtained by a person of ordinary skill in the art without making creative efforts belong to the scope of protection of the present invention. It should be understood that the specific embodiments described are merely illustrative of the present application and are not intended to limit the present application.

A multi-source data fusion method for dynamic system scenario behavior deduction and reliability prediction analysis according to the present invention is mainly used for simulating trajectory generation of a complex process control system and achieve deduction and analysis of dynamic reliability and of a scenario sequence of the system. Algorithm routines and software application platforms involved are programmed and implemented on MATLAB/Simulink 2021 and Eclipse 4.18 platforms respectively.

Embodiment 1

Figure 1:
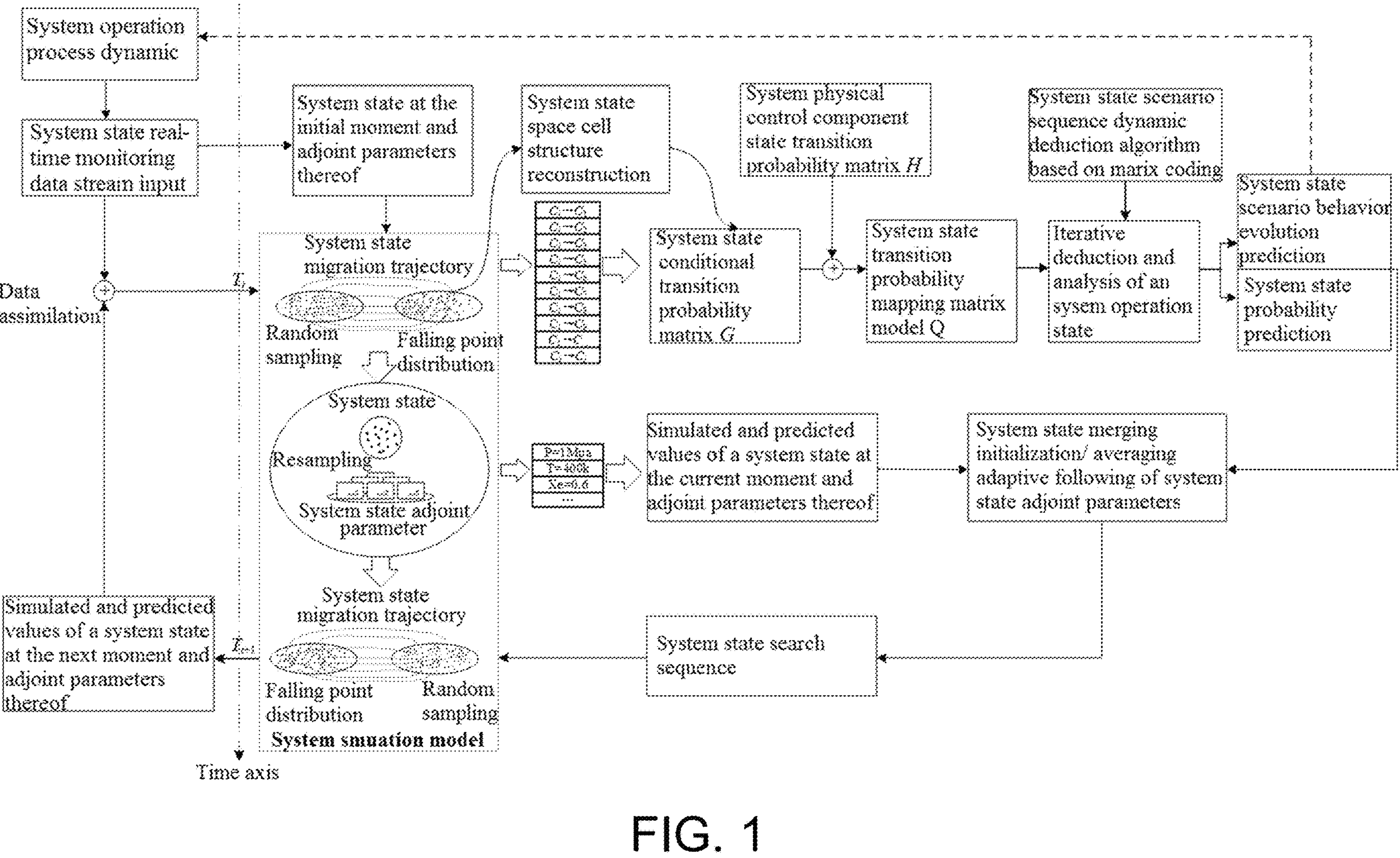
FIG. 1 is a schematic diagram of a multi-source data fusion method for dynamic system scenario behavior deduction and reliability prediction analysis according to Embodiment 1 of the present invention.
Figure 2:
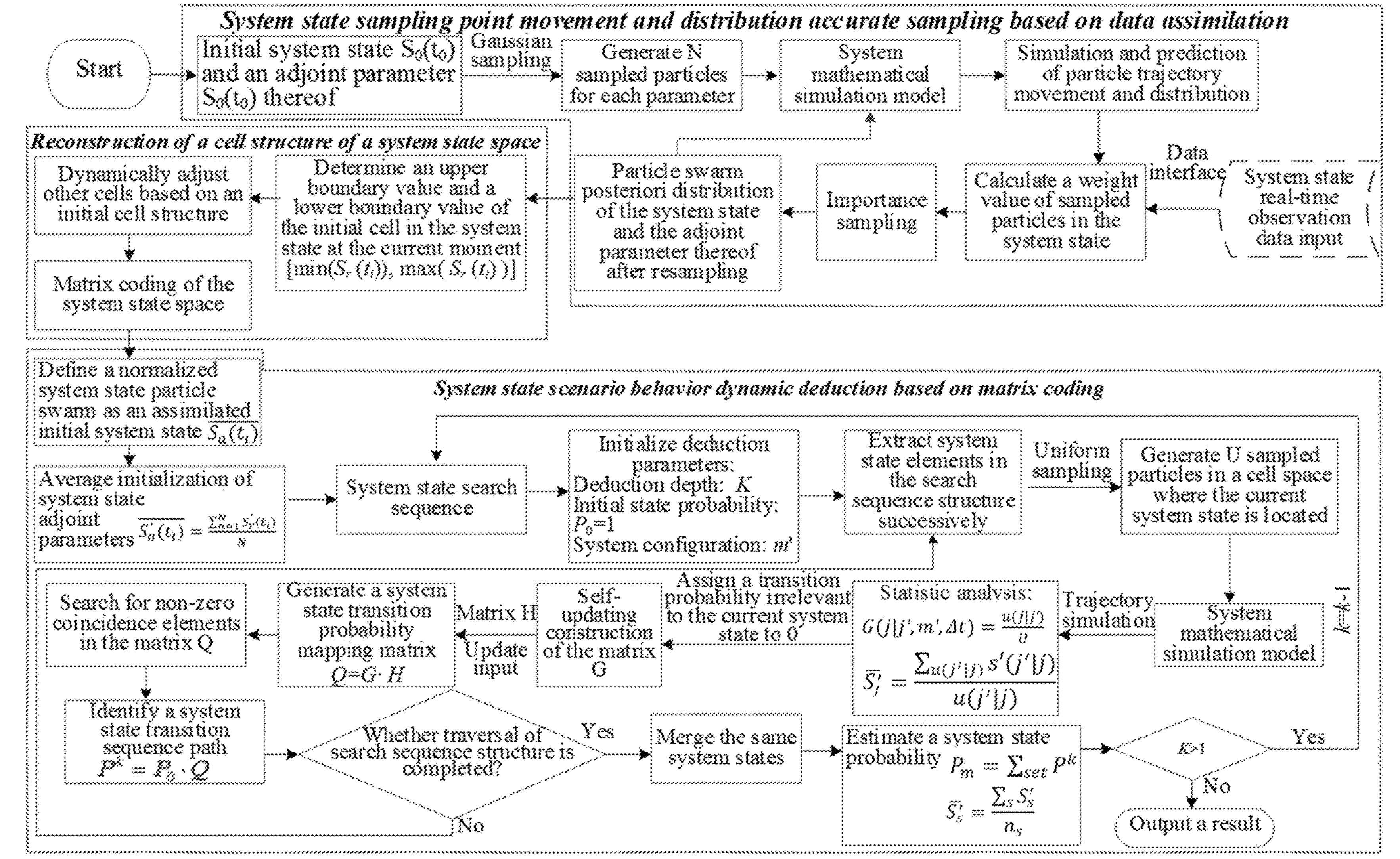
FIG. 2 is a flow diagram of a multi-source data fusion method for dynamic system scenario behavior deduction and reliability prediction analysis according to Embodiment 1 of the present invention.

As shown in FIG. 1 and FIG. 2, a multi-source data fusion method for dynamic system scenario behavior deduction and reliability prediction analysis according to this embodiment includes the following steps:

(1) According to system operation design requirements and equipment fault mode and impact analysis, a system controlled continuous process variable state and a system control device state are subjected to discrete definition and represented by digital matrix coding, to construct an initialized system state spatio-temporal coupling model.

The system state spatio-temporal coupling model is coupling of a discretized controlled system process variable state space and a system physical control component state space at different time points.

The system physical control component state space is determined based on the system equipment fault mode and impact analysis, including finitely many states such as an equipment normal state, an equipment fault state 1, and an equipment fault state 2 and so on.

In the discretization process of the system continuous process variable state space, the system operation design requirements and modeling analysis and application accuracy requirements need to be weighed comprehensively, and a system process variable in each dimension is partitioned into a plurality of continuous but non-overlapping discretized cell spaces.

The discrete definition of the time dimension is reflected by setting of a time step. In principle, the setting of the system time step should be determined jointly according to the specific requirements of system modeling analysis and application accuracy and the cell partition of a system state space, so as to meet the principle of maximizing the possibility of system state transition between adjacent cells within the unit time step, thereby accurately describing and characterizing the system dynamic behavior characteristics. A matrix search time step adopted by the multi-source data fusion method for dynamic system scenario behavior deduction and reliability prediction analysis according to the present invention is consistent with a system simulation time step.

System states at different time points are correlated by a Chapman-Kolmogorov equation to achieve the interactive coupling between a system physical component state discrete cell space and a system process variable state discrete cell space, and system state spatio-temporal coupling model is obtained by digital coding.

(2) A system mathematical simulation model is established according to a system dynamic operation equation and control rules, an equipment fault injection model is constructed according to a failure mode and a failure mechanism of system components, and the equipment fault injection model is embedded into a system simulation model.

The system simulation model includes a normal simulation model and the equipment fault injection model.

The normal simulation model is constructed with system operation dynamic partial differential equations and control rules as the basic input of modeling, which is achieved by an MATLAB function and a Simulink simulation module.

The equipment fault injection model is constructed based on the analysis of an equipment failure mode and an equipment failure mechanism. The equipment failure mode is reflected as an explicit mapping relationship between input and output of equipment parameters, and an internal mapping function of the equipment fault injection model is determined by the equipment failure mechanism, which is also achieved in an MATLAB/Simulink simulation environment.

(3) Based on the initialized system state spatio-temporal coupling model, an initial system state at the initial moment and an adjoint parameter $$(S_0(t_0), S_0'(t_0))$$

of the initial system state at the initial moment are determined according to system state initial value input or assumption, and subjected to Gaussian sampling with a variance being $\sigma$ for N times to obtain a particle swarm distribution $$(S_{ss}(t_0), S_{ss}'(t_0))$$

of the initial system state at the initial moment, and an operation trajectory and a final value position point distribution $$S_{se}(t_i), S_{se}'(t_i))$$

of sampled particles at different moments $t_i$ are simulated and predicted on the system simulation model.

(4) According to the input of an actual observed value pair $$(S_m(t_i), S_m'(t_i))$$

of a system state at the next moment and an adjoint parameter of the system state at the next moment, weight values $$w_n \text{ and } w_n'$$

of the sampled particle of each initial system state are calculated by means of a distance between a simulated and predicted value $$(S_{se}(t_i), S_{se}'(t_i))$$

and the actual observed value $$(S_m(t_i), S_m'(t_i))$$

of the sampled particles of the system state.

The dispersion degree distribution (represented by distance) of the simulated and predicted value of the sampled particles of the system state with respect to the actual observed value is calculated by the following formula:

$$w_n = \frac{1}{\sqrt{2\pi}\,\sigma} e^{-\frac{(S_{se}(t_i) - S_m(t_i))^2}{2\sigma^2}} \tag{1}$$

Resampling is performed according to the weight values (importance) of the particles of the system state to obtain a posteriori estimation distribution $$(S_r(t_i), S_r'(t_i))$$

of a more accurate assimilated system state and an adjoint parameter of the assimilated system state, and the posteriori estimation distribution is re-used as initial system state particle swarm input, on the system simulation model, for further simulation and prediction of a particle posteriori estimation distribution $$(S_{se}(t_{i+1}), S_{se}'(t_{i+1}))$$

of the system state at the next moment $t_{i+1}$ and the adjoint parameter of the system state at the next moment $t_{i+1}$.

(5) According to the particle swarm distribution of the assimilated system state $(S_r(t_i))$, a cell structure of the system state space is reconstructed, meanwhile, the assimilated system state is used as an assimilated initial system state $(\overline{S_a(t_i)})$ at the current moment for system state scenario behavior deduction and analysis, and the resampled system state adjoint parameter $$S_r'(t_i)$$

is subjected to averaging initialization to adapt to an assimilated initial system state $$\overline{S_a'(t_i)}.$$

The reconstruction of the cell structure of the system state space refers to that two particles furthest apart in the system state particle swarm are taken as an upper boundary value and a lower boundary value of a cell of the assimilated initial system state, the upper boundary value and the lower boundary value are used as a new scale to repartition and define the system state space, and cells located at boundaries of a system normal interval are adaptively adjusted according to a remaining space of the normal interval after other cells are determined, thereby finally completing the reconstruction of the cell structure in the system state space.

The reconstructed cells of the system state space are subjected to digital coding again to obtain a new system state space matrix model.

The averaging of the system state adjoint parameter $$S_r'(t_i)$$

is to average the simulated and predicted values of all N sampled particles of the system state adjoint parameter, which is calculated by the following formula:

$$\overline{S_a'(t_i)} = \frac{\sum_{n=1}^{N} S_r'(t_i)}{N} \tag{2}$$

where $$S_r'(t_i)$$

denotes a particle value after resampling of the system state adjoint parameter at the current moment, and N denotes the total number of sampled particles of the initial system state.

(6) The assimilated and updated system state and the average adjoint parameter $$\left(\overline{S_a(t_i)}, \overline{S_a'(t_i)}\right)$$

of the assimilated and updated system state are taken as the assimilated initial system state $S_0(t_i)$ and the adjoint parameter $$S_0'(t_i)$$

of the assimilated initial system state at the current time, and added into a system state search sequence structure to initially set an occurrence probability $P_0$, a search depth K and a system configuration m' of the system state at the current moment.

The system configuration is configured by a real-time monitoring state of system physical equipment, and configured extended system states are constructed into an initial search sequence structure.

(7) The extended system states in the search sequence structure are extracted successively, uniform sampling is performed on an originating point of a current extended system state according to the position of a cell where the current extended system state is located, and dynamic trajectory migration changes of random sampling points in different cells of the system state space under a specific system configuration are simulated through the system mathematical simulation model. Further, uniform sampling refers to uniformly and randomly extracting U representative point particles from the cell space where the current extended system state is located, and performing simulation U times on the system simulation model.

(8) The distribution of falling points of a system state operation trajectory in different cell spaces is statistically analyzed, and a conditional transition probability of a given system state is calculated, and coupled with a system physical component state transition probability to generate a system state transition probability mapping matrix model Q. Meanwhile, local averaging is performed on final values of the system state adjoint parameters falling into different space cells by the following formula (3), to be used as a system state adjoint parameter corresponding to an initial cell in the next process of iterative search.

$$\overline{s_s'} = \frac{\sum_s s_s'}{n_s} \tag{3}$$

where $$s_s'$$

denotes a particle value of different adjoint parameters in a set to which the same system states belong, $$\sum_s s_s'$$

denotes the sum of the particle values of all adjoint parameters in the set to which the same system states belong, $n_s$ denotes the number of particles of the same system states in the set, and $$\overline{s_s'}$$

denotes a local average value of the system state parameters falling into different cells.

The system state transition probability mapping matrix model includes a system physical component state transition probability matrix (the matrix H) and a system state conditional transition probability matrix (the matrix G).

The system physical component state transition probability matrix is constructed based on the failure mode and impact analysis of the system components and finite state machine modeling. Under the assumptions that the components fail and are independent of each other and an operation time span is small, the system physical component state transition probability may be simply treated as a product of failure probabilities of single components. In the self-updating construction process of the model, the system physical component state transition probability matrix H may be updated in time according to the feedback of system real-time operation monitoring data for the state of the system physical equipment, and state transition probabilities unrelated to the current system configuration are annihilated to achieve low-dimensional sparse sparsification of the matrix H.

The self-updating construction of the system state conditional transition probability matrix is achieved by an equal-weight dot product method based on Monte Carlo simulation. On the basis of the aforementioned construction of the system simulation model, accurate sampling of system state cell representative points, and system state migration trajectory simulation, tracing and statistical analysis, the system state conditional transition probability is calculated by using the following equal-weight dot product method:

$$G(j \mid j', m', \Delta t) = \frac{u(j \mid j')}{U} \tag{4}$$

where u(j|j') denotes the number of system states transferred from a cell j' to a cell j under a given system configuration m', and U denotes the total number of sampled particles.

The transition probability of the system state in different cell spaces may be approximatively estimated by a ratio of the number of falling points of a specific cell to the total number of sampling points.

Finally, by multiplying the matrix G and the matrix H, the updated system state transition probability matrix Q may be obtained.

(9) Through forward search analysis of a synchronous system state transition probability matrix model, a potential transition sequence path of the system state is identified, and an occurrence probability of the system state transition sequence path is calculated.

The core of search analysis of the system state space is to identity non-zero or coincidence elements (suitable for the application of the truncation criterion ε) in the system state transition probability mapping matrix Q. The occurrence probability of the sequence path is a product of transition probabilities of different branches on the sequence path.

(10) After the completion of each search step (traversing all extended system states in the search sequence structure), system state transition branches with the same final state are merged, and an occurrence probability of the merged system states is equal to the sum of probabilities of all system state transition branches in the set to which the same system states belong.

(11) An exclusive system state after the merging is re-added to the search sequence structure as a new parent node, a system state transition probability mapping probability sub-matrix Q is reconstructed for each extended system state in the search sequence structure by Monte Carlo random sampling simulation and statistical analysis, the next iterative search is proceeded to until a specified deduction search depth K or a specific exit condition is reached, and updating and input of an assimilation value of a system state of the next moment are waited for.

(12) The dynamic evolution and development process of the system state scenario sequence is graphically displayed through an interface in the form of a vector matrix, and development possibilities of the system state scenario sequence are ranked according to probabilistic risks for proactive guidance of the operation safety of nuclear power plants.

By means of the method according to this embodiment, on the basis of the Markov/CCMT dynamic reliability prediction analysis method, by combining with the fusion and assimilation methods of multi-source data (system state real-time monitoring data stream input, simulation data, system equipment reliability characteristics data, etc.), simulation and statistical analysis are performed on the complex dynamic behavior characteristics of the digital process control under strong interaction coupling, nonlinearity and high uncertainty by using the Monte Carlo probability model random sampling idea. Moreover, on this basis, the forward deduction analysis and reliability prediction of the system operation states are achieved through the dynamic search analysis of the system state transition probability matrix model, the key technical problems such as the difficulty to acquire an analytical solution of a nonlinear dynamic process control system and to alleviate search explosions of the system state space are solved, and thus a foundation is laid for accurate modeling, efficient analysis and calculation, and intelligent operation and maintenance for digital instrumentation and control systems of large complex nuclear power plants.

Embodiment 2

Figure 3:
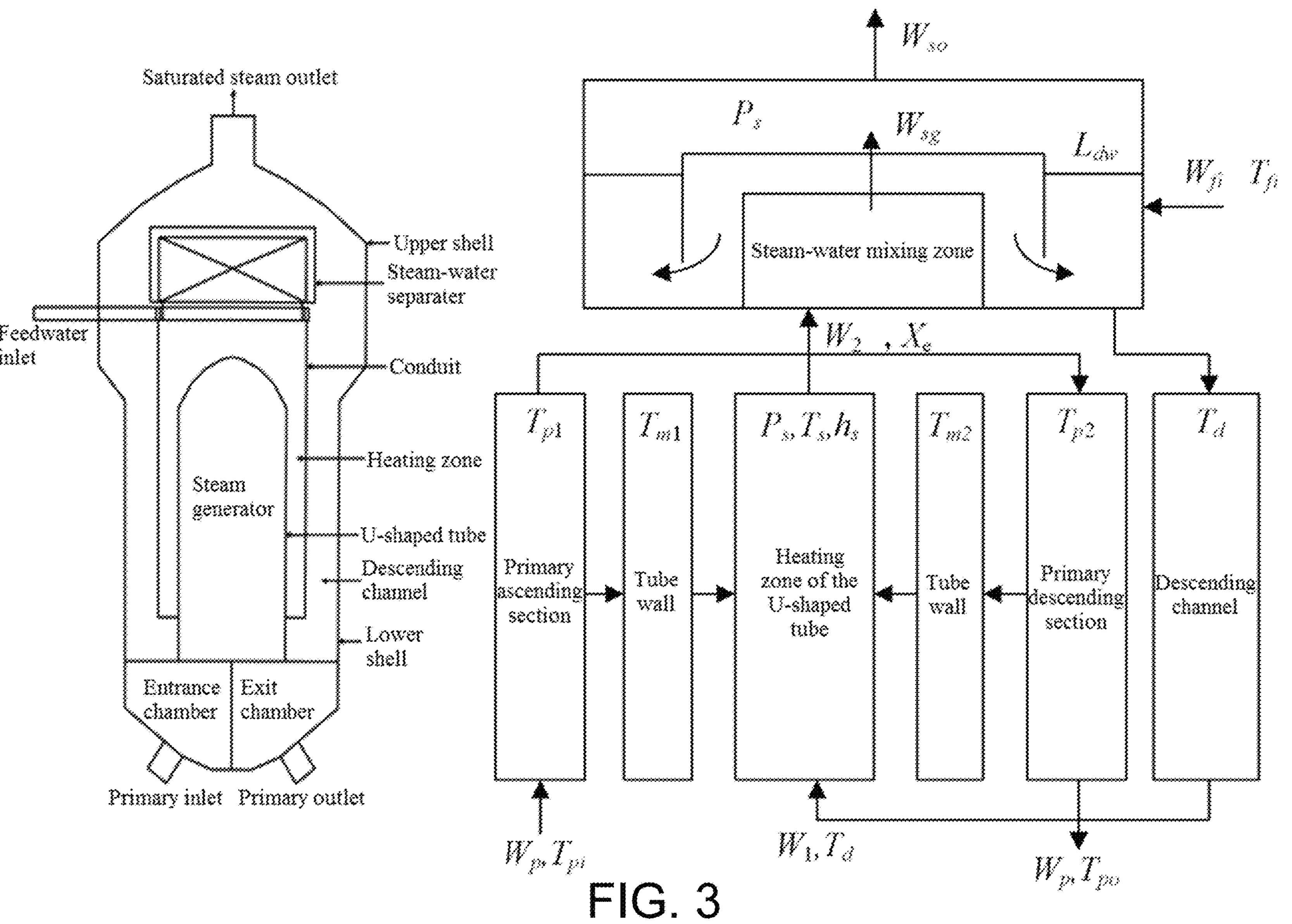
FIG. 3 is a structural block diagram of a steam generator water level control system for a nuclear power plant according to Embodiment 2 of the present invention.
Figure 4:
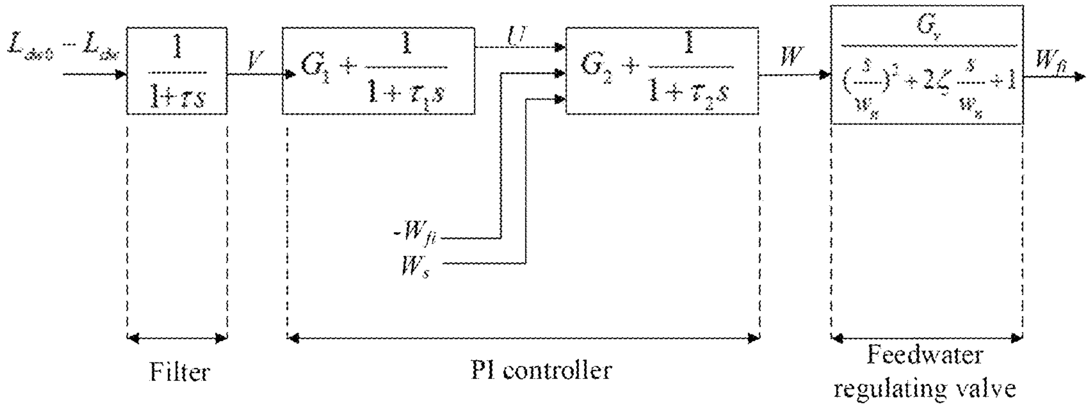
FIG. 4 is a schematic diagram of a control process of a steam generator water level control system for a nuclear power plant according to Embodiment 2 of the present invention.

As shown in FIG. 3 and FIG. 4, this embodiment takes a simplified steam generator water level control system of a nuclear power plant as an example to carry out dynamic reliability modeling and scenario sequence deduction and analysis of a digital process control system to verify the effectiveness of the method according to the present invention. The implementation steps specifically include:

Step 1: The fault mode and impact analysis is performed on a digital control unit in the example system, and a state of a physical control unit of the system is defined. The steam generator water level control system of the nuclear power plant in this embodiment consists of a water level sensor, a steam flow sensor, a feedwater flow sensor, a PI controller, a feedwater flow regulating valve, and a steam flow regulating valve and other equipment. It is assumed that a sensor unit has four states: operation, stuck, constant gain variation, and constant deviation failure, and a PI control unit and that a feedwater flow regulating unit have four states: operation, stuck, high output, and low output. Since the water level of a steam generator is mainly controlled by the feedwater flow regulating valve in practical application, the operation and failure mode of the steam flow regulating valve are not considered in this embodiment.

States of system physical control components are represented by the following vector matrix [S1, S2, S3, S4, S5], where S1 denotes a state of the water level sensor, S2 denotes a state of the steam flow sensor, S3 denotes a state of the feedwater flow sensor, S4 denotes a state of the PI controller, and S5 denotes a state of the feedwater flow regulating valve. Digital codes corresponding to different system equipment states are shown in Table 1.

TABLE 1

| Definitions of digital codes of different equipment states | | | | |
|---|---|---|---|---|
| Digital | Digital code/probability | | | |
| component | 1 | 2 | 3 | 4 |
| S1 | Operation<br>— | Stuck<br>$1\times10^{-5}$/h | Constant gain variation<br>$1\times10^{-5}$/h | Constant deviation failure<br>$1\times10^{-5}$/h |
| S2 | Operation<br>— | Stuck<br>$1\times10^{-5}$/h | Constant gain variation<br>$1\times10^{-5}$/h | Constant deviation failure<br>$1\times10^{-5}$/h |
| S3 | Operation<br>— | Stuck<br>$1\times10^{-5}$/h | Constant gain variation<br>$1\times10^{-5}$/h | Constant deviation failure<br>$1\times10^{-5}$/h |
| S4 | Operation<br>— | Stuck<br>$1\times10^{-5}$/h | High output<br>$1\times10^{-5}$/h | Low output<br>$1\times10^{-5}$/h |
| S5 | Operation<br>— | Stuck<br>$1\times10^{-5}$/h | High output<br>$1\times10^{-5}$/h | Low output<br>$1\times10^{-5}$/h |

Step 2: According to the structure, control rule and operation characteristic analysis of the steam generator water level control system of the nuclear power plant as shown in FIG. 1 and FIG. 2, system dynamic equations are established as follows:

$$\frac{dT_{p1}}{dt}=-\left(\frac{W_{pi}}{M_p}+\frac{U_{pm}\cdot A_{pm}}{M_p\cdot C_p}\right)\cdot T_{p1}+\frac{U_{pm}\cdot A_{pm}}{M_p\cdot C_p}\cdot T_{m1}+\frac{W_{pi}}{M_p}\cdot T_{pi} \tag{5}$$

$$\frac{dT_{p2}}{dt}=\frac{W_{pi}}{M_p}\cdot T_{p1}-\left(\frac{W_{pi}}{M_p}+\frac{U_{pm}\cdot A_{pm}}{M_p\cdot C_p}\right)\cdot T_{p2}+\frac{U_{pm}\cdot A_{pm}}{M_p\cdot C_p}\cdot T_{m2} \tag{6}$$

$$\frac{dT_{m1}}{dt}=\frac{U_{pm}\cdot A_{pm}}{M_m\cdot C_m}\cdot T_{p1}-\frac{U_{pm}\cdot A_{pm}+U_{ms}\cdot A_{ms}}{M_m\cdot C_m}\cdot T_{m1}+\frac{U_{ms}\cdot A_{ms}}{M_m\cdot C_m}\cdot T_s \tag{7}$$

$$\frac{dT_{m2}}{dt}=\frac{U_{pm}\cdot A_{pm}}{M_m\cdot C_m}\cdot T_{p2}-\frac{U_{pm}\cdot A_{pm}+U_{ms}\cdot A_{ms}}{M_m\cdot C_m}\cdot T_{m2}+\frac{U_{ms}\cdot A_{ms}}{M_m\cdot C_m}\cdot T_s \tag{8}$$

$$\frac{dP_s}{dt}=\frac{trc12\cdot U_{ms}\cdot A_{ms}}{\det}\cdot T_{m1}+\frac{trc12\cdot U_{ms}\cdot A_{ms}}{\det}\cdot T_{m2}-\frac{trc12\cdot trc4}{\det}\cdot T_{dw}+\frac{trc12\cdot trc1}{\det}\cdot T_d+\frac{(trc3\cdot trc13+trc5\cdot trc12)}{\det}+trc14 \tag{9}$$

$$\frac{dx_e}{dt}=\frac{trc11\cdot U_{ms}\cdot A_{ms}}{\det}T_{m1}+\frac{trc11\cdot U_{ms}\cdot A_{ms}}{\det}\cdot T_{m2}-\frac{trc4\cdot trc11}{\det}\cdot T_{dw}+\frac{trc1\cdot trc11}{\det}\cdot T_d-\frac{(trc2\cdot trc13-trc5\cdot trc11)}{\det}+trc15 \tag{10}$$

$$\frac{dL_{dw}}{dt}=-\frac{1}{\rho_f}\cdot\frac{d\rho_f}{dP}\cdot\frac{dP_s}{dt}\cdot L_{dw}+\frac{1}{\rho_f\cdot A_{dw}}\cdot(W_{fi}+(1-x_e)\cdot W_3-W_1) \tag{11}$$

$$\frac{dT_{dw}}{dt}=-\frac{W_{fi}+(1-x_e)\cdot W_3}{\rho_f\cdot A_{dw}\cdot L_{dw}}\cdot T_{dw}+\frac{W_{fi}}{A_{dw}+L_{dw}+\rho_f}\cdot T_{fi}+\frac{(1-x_e)\cdot W_3}{A_{dw}\cdot L_{dw}\cdot\rho_f}\cdot T_{sat} \tag{12}$$

$$\frac{dT_d}{dt}=\frac{W_1}{M_d}\cdot T_{dw}-\frac{W_1}{M_d}\cdot T_d \tag{13}$$

$$\frac{dv}{dt}=-\frac{1}{\tau}\cdot L_{dw}-\frac{1}{\tau}\cdot v+\frac{L_{dw0}}{\tau} \tag{14}$$

$$\frac{du}{dt}=-\frac{G_1}{\tau}\cdot L_{dw}+\left(-\frac{G_1}{\tau}+\frac{1}{\tau_1}\right)\cdot v+\frac{G_1L_{dw0}}{\tau} \tag{15}$$

$$\frac{dw}{dt}=-\frac{G_1\cdot G_2}{\tau}\cdot L_{dw}+G_2\cdot\left(\frac{1}{\tau_1}-\frac{G_1}{\tau}\right)\cdot v+\frac{1}{\tau_2}\cdot u+\frac{G_1\cdot G_2\cdot L_{dw0}}{\tau} \tag{16}$$

$$\frac{dm}{dt}=-W_{fi}+W_{so} \tag{17}$$

-continued $$\frac{dr}{dt}=G_v\cdot w_{nv}^2\cdot w+\frac{G_v\cdot w_{nv}^2}{\tau_2}\cdot m-2\cdot z_{tv}\cdot w_{nv}\cdot r-w_{nv}^2\cdot(1-G_v\cdot G_2)\cdot W_{fi}+2\cdot z_{tv}\cdot w_{nv}\cdot r_0+G_v\cdot G_2\cdot w_{nv}^2\cdot W_{so} \tag{18}$$

$$\frac{dW_{fi}}{dt}=r-r_0 \tag{19}$$

where $$U_{pm}=\frac{1}{\frac{1}{h_i}+\frac{D_{in}}{2\cdot K_{th}}\cdot\log\left(\frac{D_{avg}}{D_{in}}\right)} \tag{20}$$

$$U_{ms}=\frac{1}{\frac{1}{h_d}+\frac{D_{out}}{2\cdot K_{th}}\cdot\log\left(\frac{D_{out}}{D_{avg}}\right)} \tag{21}$$

$$D_{avg}=\frac{(D_{in}+D_{out})}{2} \tag{22}$$

$$W_{so}=C_{so}\cdot P_s \tag{23}$$

$$W_1=C_1\cdot\frac{\sqrt{\rho_d\cdot(L_d+L_{dw})-\rho_s\cdot L_d-\rho_f\cdot L_{dw}}}{12} \tag{24}$$

$$W_2=cfdr4\cdot\frac{dP_s}{dt}-cfdr5\cdot\frac{dx_e}{dt}-\frac{1}{x_e}\cdot\frac{\rho_g}{\rho_f}\cdot\frac{(W_{fi}-W_1)}{cfdr2}+\frac{1}{x_e}\cdot\frac{W_{so}}{cfdr2} \tag{25}$$

$$W_3=\frac{1}{x_e}\cdot\left(\frac{cfdr3}{cfdr2}\cdot\frac{dP_s}{dt}-\frac{\rho_g}{\rho_f}\cdot\frac{(W_{fi}-W_1)}{cfdr2}+\frac{W_{so}}{cfdr2}\right) \tag{26}$$

$$\det=trc11\cdot trc3+trc12\cdot trc2 \tag{27}$$

$$cfdr1=\frac{(1-x_e)}{x_e}\cdot\frac{(V_{dr}-A_{dw}\cdot L_{dw})}{\rho_f\cdot A_{dw}}\cdot\frac{d\rho_g}{dP}-\frac{L_{dw}}{\rho_f}\cdot\frac{d\rho_f}{dP} \tag{28}$$

$$cfdr2=1+\frac{(1-x_e)}{x_e}\cdot\frac{\rho_g}{\rho_f} \tag{29}$$

$$cfdr3=(V_{dr}-A_{dw}\cdot L_{dw})\cdot\frac{d\rho_g}{dP}+\frac{\rho_g}{\rho_f}\cdot A_{dw}\cdot L_{dw}\cdot\frac{d\rho_f}{dP} \tag{30}$$

$$cfdr4=\frac{1}{x_e}\cdot\frac{cfdr3}{cfdr2}-\frac{V_r\cdot\left(\frac{dv_f}{dP}+x_e\cdot\frac{dv_{fg}}{dP}\right)}{(v_f+x_e\cdot v_{fg})^2} \tag{31}$$

$$cfdr5=\frac{V_r\cdot v_{fg}}{(v_f+x_e\cdot v_{fg})^2} \tag{32}$$

$$trc1=W_1\cdot C_{ps}+V_s\cdot\rho_s\cdot trc6\cdot\frac{W_1}{M_d}-U_{ms}\cdot A_{ms}\cdot\frac{L_{sb}}{L} \tag{33}$$

$$trc2=V_s\cdot(\rho_s\cdot trc7+h_s\cdot trc9)+h_e\cdot cfdr4 \tag{34}$$

$$trc3=V_s\cdot(\rho_s\cdot trc8+h_s\cdot trc10)-h_e\cdot cfdr5 \tag{35}$$

$$trc4=\frac{V_s\cdot\rho_s\cdot trc6\cdot W_1}{M_d} \tag{36}$$

$$trc5=\left(\frac{h_e}{x_e}\cdot\frac{\rho_g}{\rho_f}\cdot\frac{(W_{fi}-W_1)}{cfdr2}-2\cdot U_{ms}\cdot A_{ms}\cdot\left(\frac{L_{sb}}{2\cdot L}+\frac{L_b}{L}\right)\right)\cdot T_{sat} \tag{37}$$

$$trc6=\frac{C_{ps}\cdot L_{sb}}{2\cdot L} \tag{38}$$

$$trc7=\frac{C_{ps}\cdot L_{sb}}{2\cdot L}\cdot\frac{dT_{sat}}{dP}+\frac{L_b}{L}\cdot\left(\frac{dh_f}{dP}+\frac{x_e}{2}\cdot\frac{dh_{fg}}{dP}\right) \tag{39}$$

$$trc8=\frac{L_b}{2\cdot L}\cdot h_{fg} \tag{40}$$

-continued $$trc9 = \frac{L_{sb}}{2 \cdot L} \cdot \frac{d\rho_f}{dP} - \frac{L_b}{L} \cdot \frac{\left(\frac{dv_f}{dP} + \frac{x_e}{2} \cdot \frac{dv_{fg}}{dP}\right)}{\left(v_f + \frac{x_e}{2} \cdot v_{fg}\right)^2} \quad (41)$$

$$trc10 = \frac{L_b}{L} \cdot \frac{\frac{v_{fg}}{2}}{\left(v_f + \frac{x_e}{2} \cdot v_{fg}\right)^2} \quad (42)$$

$$trc11 = V_s \cdot trc9 + cfdr4 \quad (43)$$

$$trc12 = V_s \cdot trc10 + cfdr5 \quad (44)$$

$$trc13 = W_1 + \frac{1}{x_e} \cdot \frac{\rho_g}{\rho_f} \cdot \frac{(W_{fi} - W_1)}{cfdr2} \quad (45)$$

$$trc14 = -\frac{(trc3 + h_e \cdot trc12)}{\det \cdot x_e \cdot cfdr2} \cdot W_{so} \quad (46)$$

$$trc15 = \frac{(trc2 - h_e \cdot trc11)}{\det \cdot x_e \cdot cfdr2} \cdot W_{so} \quad (47)$$

-continued $$\rho_s = \frac{(\rho_f + \rho_d)}{2} \cdot \frac{L_{sb}}{L} + \frac{1}{v_f + \frac{x_e}{2} \cdot v_{fg}} \cdot \frac{L_b}{L} \quad (48)$$

$$h_s = C_{ps} \cdot \frac{(T_d + T_{sat})}{2} \cdot \frac{L_{sb}}{L} + \left(h_f + \frac{x_e}{2} \cdot h_{fg}\right) \cdot \frac{L_{sb}}{L} \quad (49)$$

$$h_e = h_f + x_e \cdot h_{fg} \quad (50)$$

$$T_s = \frac{(T_d + T_{sat})}{2} \cdot \frac{L_{sb}}{L} + T_{sat} \cdot \frac{L_b}{L} \quad (51)$$

$$L = L_{sb} + L_b \quad (52)$$

Based on the above system dynamic equations, a system mathematical simulation is established in the MATLAB/Simulink simulation environment, and a fault injection model is built for the digital components and embedded into the system simulation model. The symbols and meanings of relevant parameters in the model are shown in Table 2.

TABLE 2

Relevant variables and symbol meanings in embodiments

| Symbol | Meaning | Unit | Value |
|---|---|---|---|
| $C_{pi}$ | Specific heat capacity of subcooled water | kJ/(kg · ° C.) | |
| $C_{ps}$ | Specific heat capacity of saturated water | kJ/(kg · ° C.) | |
| $\frac{dh_f}{dP}$ | Derivative of the specific enthalpy of saturated water with respect to pressure | kJ/(kg · Mpa) | |
| $\frac{dh_g}{dP}$ | Derivative of the specific enthalpy of saturated water with respect to pressure | kJ/(kg · Mpa) | |
| $\frac{d\rho_f}{dP}$ | Derivative of the density of saturated water with respect to pressure | kg/(m³ · Mpa) | |
| $\frac{d\rho_g}{dP}$ | Derivative of the density of saturated steam with respect to pressure | kg/(m³ · Mpa) | |
| $\frac{dv_f}{dP}$ | Derivative of the specific volume of saturated water with respect to pressure | m³/(kg · Mpa) | |
| $\frac{dv_g}{dP}$ | Derivative of the specific volume of saturated steam with respect to pressure | m³/(kg · Mpa) | |
| $h_f$ | Specific enthalpy of saturated water | kJ/kg | |
| $\rho_f$ | Density of saturated water | kg/m³ | |
| $h_g$ | Specific enthalpy of saturated steam | kJ/kg | |
| $\rho_g$ | Density of saturated steam | kg/m³ | |
| $\rho_d$, $\rho_{w1}$, $\rho_{w2}$ | Density of subcooled water | kg/m³ | |
| $T_{sat}$ | Saturation temperature | ° C. | |
| $v_f$ | Specific volume of saturated water | m³/kg | |
| $v_g$ | Specific volume of saturated steam | m³/kg | |
| $A_d$ | A flow area of feedwater inside the annular channel | m² | 2.973 |
| $A_{dw}$ | A flow area of feedwater inside the annular channel | m² | 10.288 |
| $C_1$ | Head loss between an annular channel and metal tubes entrance | $(kg/s) \cdot (kg/m^2)^{-1/2}$ | $\frac{1}{\sqrt{9.733 \times 10^{-6}}}$ |
| $C_m$ | Specific heat capacity of the metal tubes | J/(kg · ° C.) | 460.5 |
| $C_{so}$ | Proportional constant of steam flow to saturated steam pressure | kg/(s · Mpa) | 80.23 |
| $D_{in}$ | Inside diameter of U-shaped tubes | m | 0.0197 |
| $D_{out}$ | Outside diameter of the U-shaped tubes | m | 0.0222 |
| $h_{oi}$ | Convective heat transfer coefficient between primary loop water and the metal tubes | J/(s · m² · ° C.) | $2.555 \times 10^4$ |
| $h_{ol}$ | Convective heat transfer coefficient between secondary loop water and the metal tubes | J/(s · m² · ° C.) | $4.25 \times 10^3$ |

TABLE 2-continued

| Relevant variables and symbol meanings in embodiments | | | |
|---|---|---|---|
| Symbol | Meaning | Unit | Value |
| $K_{th}$ | Thermal conductivity of the metal tubes | J/(s · m · ° C.) | 55.0012 |
| L | Height of the U-shaped tubes | m | 10.83 |
| $L_d$ | Height of an annular channel | m | 10.83 |
| $L_{sb}$ | Height of a subcooled water column | m | 1.057 |
| N | Number of metal U-shaped tubes | | 3388 |
| $P_0$ | Predetermined pressure of the primary loop water | Mpa | 15.51 |
| $\rho_m$ | Density of the metal tubes | kg/m$^3$ | 8490 |
| $M_m$ | Total mass of half metal tubes | kg | 25629 |
| $T_{fi}$ | Temperature of a feedwater inlet flow | ° C. | 223.50 |
| $T_{pi}$ | Temperature of the primary loop water | ° C. | 311.39 |
| $V_{dr}$ | Total volume of UTSG drum | m$^3$ | 124.56 |
| $V_r$ | Internal volume of a water/steam separator | m$^3$ | 13.28 |
| $V_s$ | Volume of the secondary loop water around the metal tube | m$^3$ | 94.36 |
| $W_{pi}$ | Mass flow of the primary loop water | kg/s | 4963.30 |
| $G_1$ | Gain factor of a first PI controller | | 65.2 |
| $G_2$ | Gain factor of a second PI controller | | 1 |
| $G_v$ | Gain factor of a feedwater valve system | | 32.2 |
| $\tau_1$ | Time constant of the first PI controller | s | 250 |
| $\tau_2$ | Time constant of the second PI controller | s | 120 |
| $\tau$ | Time constant of a filter | s | 5 |
| $z_{nv}$ | Damping coefficient of the feedwater valve system | | 3.18 |
| $w_{nv}$ | Inherent frequency of the feedwater valve system | rad/s | 0.63 |
| $A_{ms}$ | Thermal contact area between the metal tubes and secondary loop water | m$^2$ | |
| $A_p$ | Flow area of primary coolant inside the metal tube | m$^2$ | |
| $A_{pm}$ | Thermal contact area between the metal tubes and primary loop water | m$^2$ | |
| $D_{avg}$ | Average diameter of the metal tubes | m | |
| $\frac{dh_{fg}}{dP}$ | $\frac{dh_g}{dP} - \frac{dh_f}{dP}$ | kJ/(kg · Mpa) | |
| $\frac{dv_{fg}}{dP}$ | $\frac{dv_g}{dP} - \frac{dv_f}{dP}$ | m$^3$/(kg · Mpa) | |
| $h_{fg}$ | $h_g - h_f$ | kJ/kg | |
| $v_{fg}$ | $v_g - v_f$ | m$^3$/kg | |
| $L_b$ | Height of a boiling column | m | |
| $M_d$ | Mass of water in annular channel | kg | |
| $M_m$ | Half the mass of metal tubes | kg | |
| $M_p$ | Half the mass of half primary loop water | kg | |
| $U_{ms}$ | Global heat transfer coefficient between the metal tubes and secondary loop water | J/(s · m$^2$ · ° C.) | |
| $U_{pm}$ | Global heat transfer coefficient between the metal tubes and primary loop water | J/(s · m$^2$ · ° C.) | |
| $W_{fi}$ | Feedwater flow | kg/s | |
| $W_{so}$ | Saturated steam flow | kg/s | |
| $T_s$ | Average temperature of subcooled water | ° C. | |

Step 3: The system physical component state transition probability matrix H(m|m',j'→j,Δt) is obtained by calculating reliability characteristic parameters such as the failure rate and repair rate of the system components.

Step 4: The initial system state and the adjoint parameter of the initial system state are determined according to the system operation state initial value input.

Assuming the initial water level of the system is $L_{dw}$=3.299 m, the adjoint parameter of the initial system state includes the average fluid temperature $T_{p1}$=302.415° C. in a primary ascending section, the average fluid temperature $T_{p2}$=295.470° C. in a primary descending section, the average tube wall temperature $T_{m1}$=296.707° C. in the primary ascending section, the average tube wall temperature $T_{m2}$=291.05° C. in the primary descending section, the working pressure $P_s$=5.699 Mpa in a gas-liquid mixing zone, the gas content $X_e$=0.2253 at an outlet of a heating zone of the U-shaped tube, the average fluid temperature $T_{dw}$=261.236° C. in a feedwater chamber, the average fluid temperature $T_d$=261.230° C. in a descending channel, a filter output signal V=2.542e−5, an output signal U=1.189e−5 of the first PI controller, an output signal W=−0.264 of the second PI controller, a difference m=−26.209 kg/s between steam flow and feedwater flow, an output signal r=−3.027e−10 of a feedwater valve, and the feedwater flow $W_{fi}$=457.218 kg/s.

Figure 5:
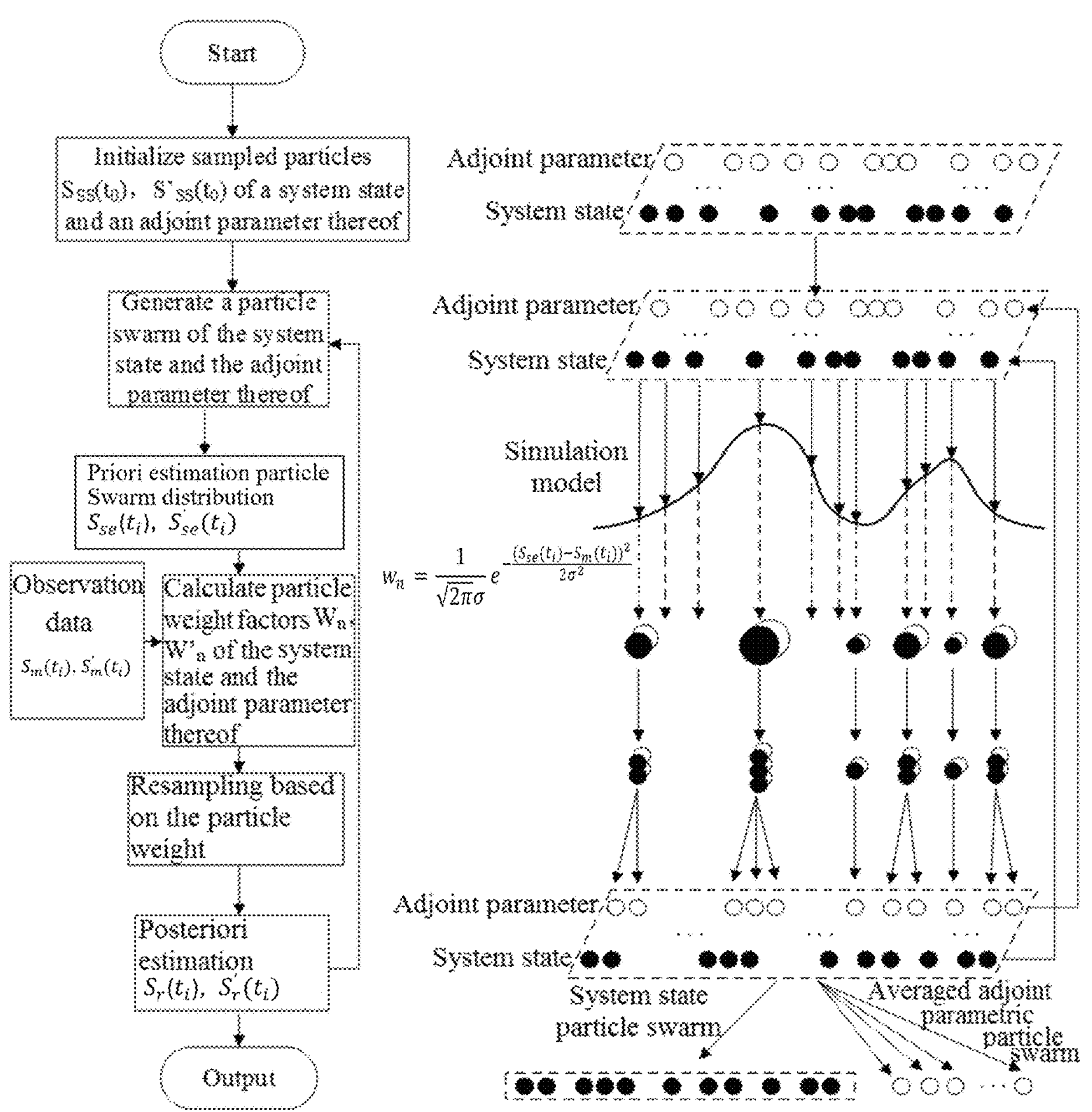
FIG. 5 is a flow diagram of a system state sampling point movement and distribution accurate sampling algorithm based on data assimilation according to Embodiment 2 of the present invention.

Step 5: The particle swarm distribution (N=100) of the initial system state and the adjoint parameter of the initial system state is obtained by Gaussian distribution random sampling. The variance of Gaussian distribution random sampling is σ=diag(0.0001, 0.001, 0.001, 0.001, 0.001, 0.0001, 0.001, 0.025, 0.001). The simulation step size of system simulation is set as Δt=0.1 s. The sampled particles of the initial system state and the adjoint parameter of the initial system state are substituted into the system mathematical simulation model to simulate the trajectory change of the system states, and the simulated and predicted movement and distribution of the sampled particle swarm of the initial system state at the initial moment and the adjoint parameter of the initial system state at the initial moment are obtained by statistical analysis. An actual observed value of the system state at the current moment is read, and exact values of the initial water level of the system at the current moment and the adjoint parameter of initial water level of the system are obtained by a particle filter-based data assimilation algorithm. The implementation process of an accurate sampling distribution method for system state sampling point movement and distribution based on data assimilation is shown in FIG. 5.

The exact values of the initial water level of the system and the adjoint parameter of the initial water level of the system after particle filter-based data assimilation are listed as follows:

$$L_{dw} = 3.2403m,\ T_{p1} = 302.4184^\circ \text{ C.},\ T_{p2} = 295.4658^\circ \text{ C.},$$
$$T_{m1} = 296.7055^\circ \text{ C.},\ T_{m2} = 291.0511^\circ \text{ C.},\ P_s = 5.6992 \text{ Mpa},$$
$$X_e = 0.2253,\ T_{dw} = 261.2309^\circ \text{ C.},\ T_d = 261.2289^\circ \text{ C.},$$
$$V = 2.542e-5,\ U = 1.189e-5,\ W = -0.264,$$
$$m = -26.209 \text{ kg/s},\ r = -3.027e-10, \text{ and } W_{fi} = 457.218 \text{ kg/s}.$$

Step 6: The system state cell space is reconstructed according to the posteriori estimation distribution of the resampled and assimilated system water level state and the adjoint parameter of the resampled and assimilated system water level state, two particles furthest apart in the resampled system state particle swarm are respectively taken as an upper boundary value and a lower boundary value of an originating cell of the initial system state at the current moment, and the upper boundary value and the lower boundary value are used as a scale to redefine and partition the cell structure of the system state space.

Assuming that an effective control interval of the system water level is: 3 m≤x≤5 m, a particle swarm distribution interval of the assimilated system state is: (3.144,3.324], which is used as a new scale to reconstruct the definition of the system water level state as follows:

$$x_1 < 3m,\ 3m \le x_2 \le 3.144m,\ 3.144m < x_3 \le 3.324m,$$
$$3.324m < x_4 \le 3.504m,\ 3.504m < x_5 \le 3.684m,\ 3.684m < x_6 \le 3.864m,$$
$$3.864m < x_7 \le 4.044m,\ 4.044m < x_8 \le 4.224m,\ 4.224m < x_9 \le 4.404m,$$
$$4.404m < x_{10} \le 4.584m,\ 4.584m < x_{11} \le 4.764m,$$
$$4.764m < x_{12} \le 4.944m,\ 4.944m < x_{13} \le 5.0m, \text{ and } x_{14} > 5m.$$

Figure 6:
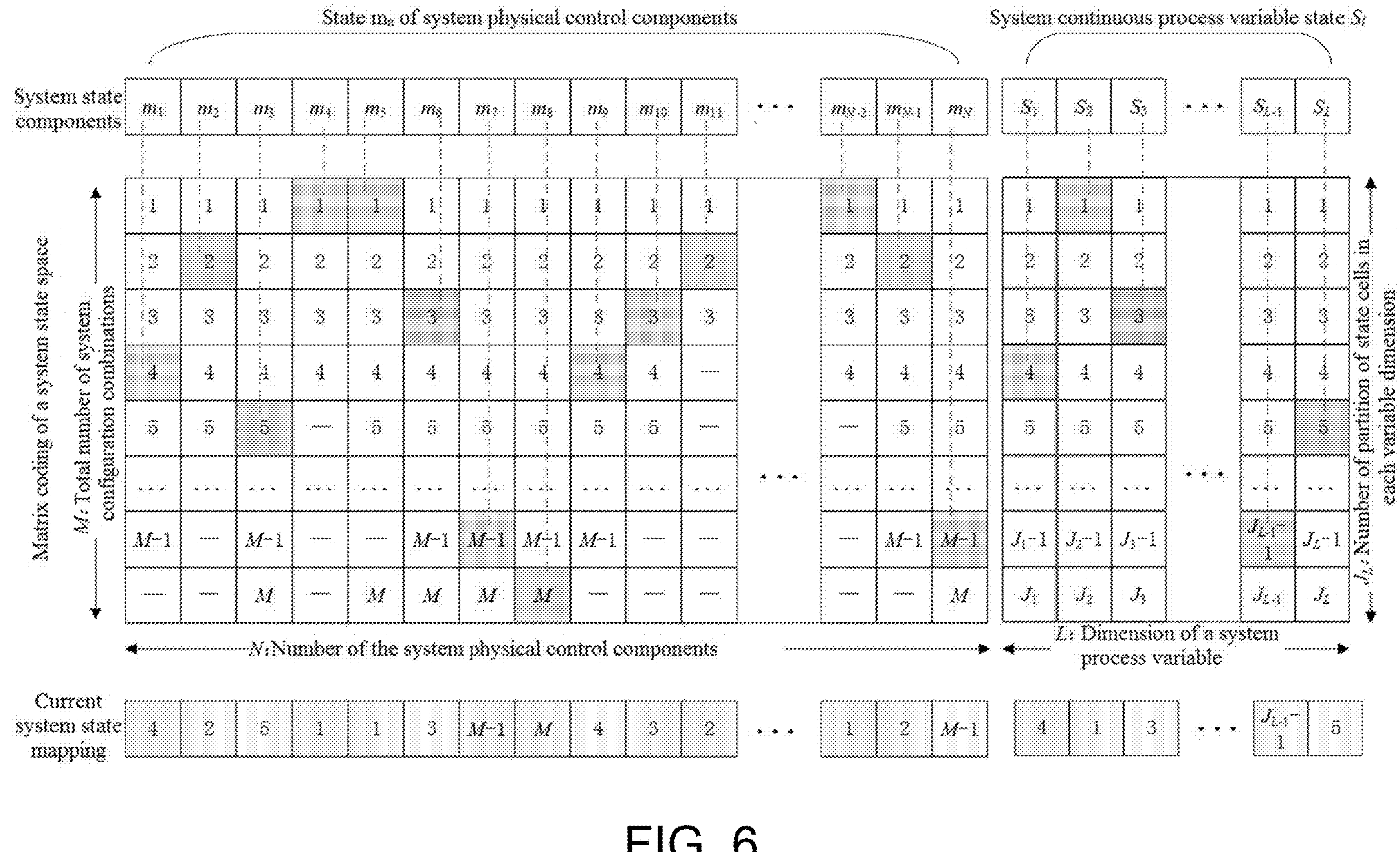
FIG. 6 shows a matrix coding process of a system state space according to Embodiment 2 of the present invention.

Step 7: The assimilated system state is added into the system state search sequence structure as the initial system state for iterative deduction and analysis of system state scenario behaviors. The implementation process of a system state scenario behavior dynamic deduction method based on matrix coding data assimilation is shown in FIG. 2, and a matrix coding process is shown in FIG. 6.

The simulation step size of system simulation is set as Δt=0.1 s, the deduction depth is set as K=5, the probability of the initial system state is set as $P_0$=1, and the truncation probability is set as $\varepsilon=10^{-5}$. The system state elements in the system state search sequence structure are extracted successively. For the extracted current system state, U=100 particles are uniformly and randomly extracted from the cell space where the extracted current system state is located. The sampled cell representative points of the current system state are injected into the system simulation model to simulate and predict the trajectory change of the sampled particles in the current system state. The number $FP_j$ of falling points of the sampled particles in each cell is counted. The conditional transition probability of the current system state is approximatively estimated by the equal-weight dot product method, and the conditional transition probabilities of the other cells are set to be 0, so that the system state conditional transition probability matrix G(j|j',m',Δt) is obtained. By multiplying the system state conditional transition probability matrix G and the system physical control component state transition probability matrix H, the system state transition probability matrix Q is obtained.

Step 8: Based on the self-updating construction and forward search of the system state probability mapping matrix model, the system state dynamic evolution deduction and analysis are achieved. The system state deduction and analysis results are shown in FIG. 7.

The above description are merely preferred embodiments of the patent of the present invention, but the scope of protection of the patent of the present invention is not limited thereto. All equivalent substitutions or changes made by any person skilled in the art according to the technical solutions of the present invention patent and invention ideas thereof within the scope disclosed in the present invention patent belong to the protection scope of the present invention patent.

A person skilled in the art may understand that all or some of the steps in the methods in the above embodiments may be accomplished by means of a program to instruct the relevant hardware, and the corresponding program may be stored in a computer-readable storage medium.

It should be noted that although the operations of the method embodiments are depicted in the accompanying drawings in a particular order, it is not required or implied that the operations must be performed in that particular order or that all of the operations shown must be performed in order to achieve the desired results. Rather, the steps depicted may be performed in a different order. Additionally or alternatively, some steps may be omitted, a plurality of steps may be combined into a single step for execution, and/or a single step may be broken down into a plurality of steps for execution.

Embodiment 3

Figure 8:
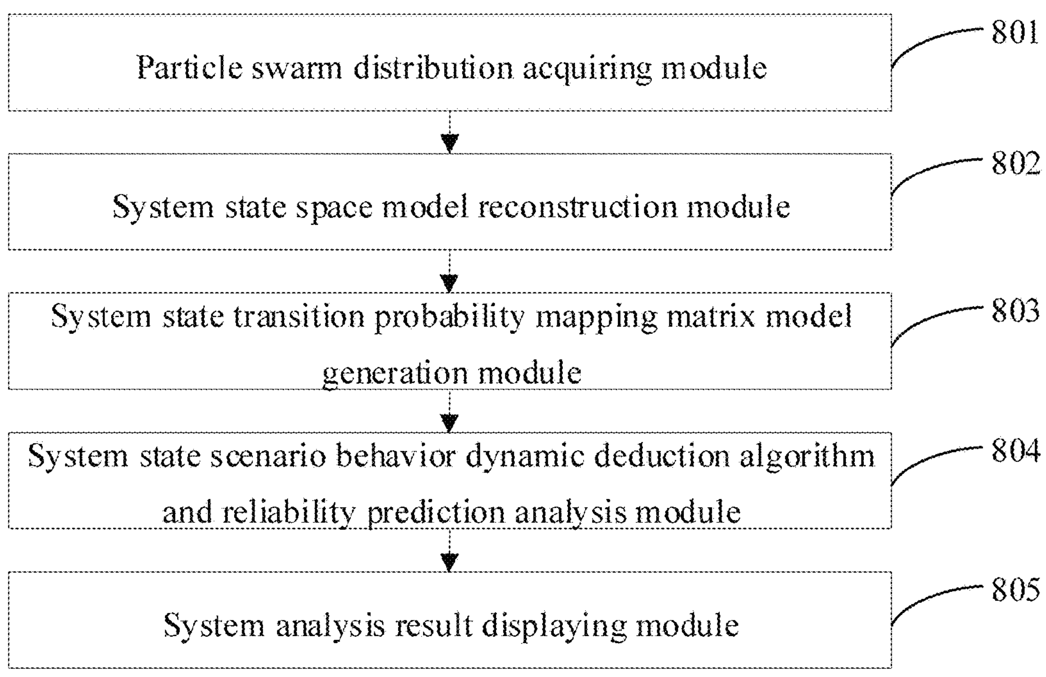
FIG. 8 is a structural block diagram of a multi-source data fusion system for dynamic system scenario behavior deduction and reliability prediction analysis according to Embodiment 3 of the present invention.

As shown in FIG. 8, this embodiment provides a multi-source data fusion system for dynamic system scenario behavior deduction and reliability prediction analysis. The system includes a particle swarm distribution acquiring module 801, a system state space model reconstruction module 802, a system state transition probability mapping matrix model generation module 803, a system state scenario behavior dynamic deduction algorithm and reliability prediction analysis module 804, and a system analysis result displaying module 805.

The particle swarm distribution acquiring module 801 is configured to: obtain, based on a system state spatio-temporal coupling model, a particle swarm distribution of an assimilated initial system state by Gaussian sampling according to system state initial value input or assumption, import the particle swarm distribution to a system simulation model to simulate a trajectory change of a particle swarm, obtain a posteriori distribution of the particle swarm of a system state at the current moment by data assimilation in combination with the real-time monitoring input of the system state, and use the posteriori distribution as a particle swarm distribution of an assimilated initial system state at the next moment.

The system state space model reconstruction module 802 is configured to: determine, based on a range of the posteriori distribution of the particle swarm of the system state at the current moment obtained during data assimilation, an upper boundary value and a lower boundary value of a system state originating cell, use the upper boundary value and the lower boundary value as a new cell scale for discrete partition of a system state space, and complete reconstruction of a system state space model by digital coding.

The system state transition probability mapping matrix model generation module 803 is configured to: perform uniform sampling on the system state originating cell to obtain a distribution of system dynamic behavior deduction initial state particle swarm, import the system dynamic behavior deduction initial state particle swarms into the system simulation model to simulate a trajectory change of the extracted particle swarms, obtain a conditional transition probability matrix of a system state under a current system configuration based on statistical estimation of the number of particle swarms falling into different cells, and obtain a Markov/CCMT system state transition probability mapping matrix model by combining the conditional transition probability matrix with a system physical component state transition probability matrix.

The system state scenario behavior dynamic deduction algorithm and reliability prediction analysis module 804 is configured to: perform, based on the constructed Markov/CCMT system state transition probability mapping matrix model, system state advance prediction analysis through applying a system state scenario behavior dynamic deduction algorithm, to further merge the same system states, push an exclusive system state obtained after merging and reduction into a search sequence structure, and repeatedly perform processes of construction updating and iterative search of the Markov/CCMT system state transition probability mapping matrix model until reaching a specified search depth.

The system analysis result displaying module 805 is configured to rank, based on occurrence probabilities of the merged system states, predicted system state scenario sequence dynamic evolution and development, and display graphically through an interface to guide safe operation of the system.

The specific implementation of each module in this embodiment may be referred to Embodiment 1 described above and will not be repeated here. It should be noted that the system provided in this embodiment is only illustrated by the partition of the above functional modules, and in practical applications, the above functions may be assigned to and achieved by different functional modules as needed, that is, the internal structure is partitioned into different functional modules to perform all or some of the functions described above.

Embodiment 4

Figure 9:
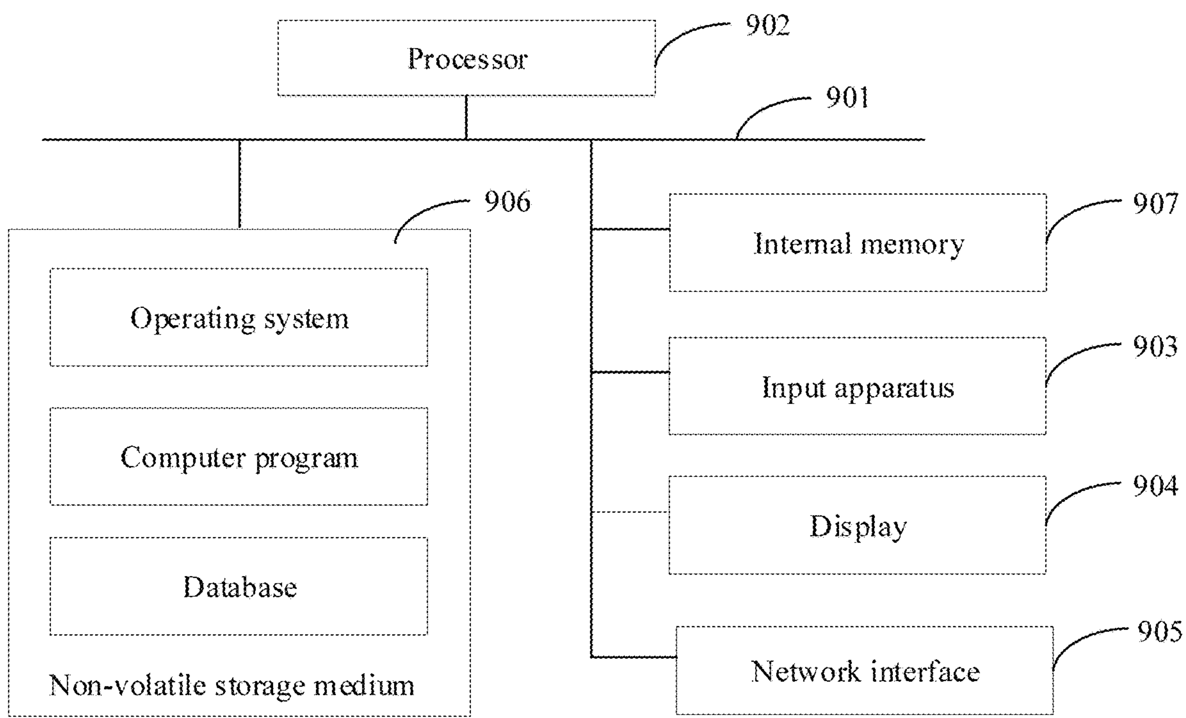
FIG. 9 is a structural block diagram of a computer device according to Embodiment 4 of the present application.

This embodiment provides a computer device. The computer device may be a computer. As shown in FIG. 9, the computer device includes a processor 902, a memory, an input apparatus 903, a display 904, and a network interface 905 connected via a system bus 901. The processor is configured to provide computing and control capabilities. The memory includes a non-volatile storage medium 906 and an internal memory 907. The non-volatile storage medium 906 has an operating system, a computer program, and a database stored therein. The internal memory 907 provides an environment for operation of the operating system and the computer program in the non-volatile storage medium. The processor 902, when executing the computer program stored in the memory, implements the above multi-source data fusion method for dynamic system scenario behavior deduction and reliability prediction analysis according to Embodiment 1. The method includes the following steps:

obtaining a particle swarm distribution of an assimilated initial system state by Gaussian sampling according to system state initial value input or assumption, importing the particle swarm distribution to a system simulation model to simulate a trajectory change of a particle swarm, obtaining a posteriori distribution of the particle swarm of a system state at the current moment by data assimilation in combination with the real-time monitoring input of system state, and using the posteriori distribution as a particle swarm distribution of an assimilated initial system state at the next moment;

determining, based on the range of the posteriori distribution of the particle swarm of the system state at the current moment obtained during data assimilation, an upper boundary value and a lower boundary value of a system state originating cell, using the upper boundary value and the lower boundary value as a new cell scale for discrete partition of a system state space, and completing reconstruction of a system state space model by digital coding;

performing uniform sampling on the system state originating cell to obtain a distribution of the system dynamic behavior deduction initial state particle swarm, importing the system dynamic behavior deduction initial state particle swarms into the system simulation model to simulate a trajectory change of the extracted particle swarms, obtaining a conditional transition probability matrix of a system state under a current system configuration based on statistical estimation of the number of particle swarms falling into different cells, and obtaining a Markov/CCMT system state transition probability mapping matrix model by combining the conditional transition probability matrix with a system physical component state transition probability matrix;

performing, based on the constructed Markov/CCMT system state transition probability mapping matrix model, system state advance prediction analysis through applying a system state scenario behavior dynamic deduction algorithm, to further merge the same system states, pushing an exclusive system state obtained after merging and reduction into a search sequence structure, and repeatedly performing processes of construction updating and iterative search of the Markov/CCMT system state transition probability mapping matrix model until reaching a specified search depth; and ranking, based on occurrence probabilities of the merged system states, predicted system state scenario sequence dynamic evolution and development, and displaying graphically through an interface to guide safe operation of the system.

Embodiment 5

This embodiment provides a storage medium. The storage medium is a computer-readable storage medium having a computer program stored thereon. The computer program, when executed by a processor, implements the above multi-source data fusion method for dynamic system scenario behavior deduction and reliability prediction analysis according to Embodiment 1. The method includes the following steps:

obtaining a particle swarm distribution of an assimilated initial system state by Gaussian sampling according to system state initial value input or assumption, importing the particle swarm distribution to a system simulation model to simulate a trajectory change of a particle swarm, obtaining a posteriori distribution of the particle swarm of a system state at the current moment by data assimilation in combination with real-time monitoring input of the system state, and using the posteriori distribution as a particle swarm distribution of an assimilated initial system state at the next moment;

determining, based on a range of the posteriori distribution of the particle swarm the system state at the current moment obtained during data assimilation, an upper boundary value and a lower boundary value of a system state originating cell, using the upper boundary value and the lower boundary value as a new cell scale for discrete partition of a system state space, and completing reconstruction of a system state space model by digital coding;

performing uniform sampling on the system state originating cell to obtain a distribution of the system dynamic behavior deduction initial state particle swarm, importing the system dynamic behavior deduction initial state particle swarms into the system simulation model to simulate a trajectory change of the extracted particle swarms, obtaining a conditional transition probability matrix of a system state under a current system configuration based on statistical estimation of the number of particle swarms falling into different cells, and obtaining a Markov/CCMT system state transition probability mapping matrix model by combining the conditional transition probability matrix with a system physical component state transition probability matrix;

performing, based on the constructed Markov/CCMT system state transition probability mapping matrix model, system state advance prediction analysis through applying a system state scenario behavior dynamic deduction algorithm, to further merge the same system states, pushing an exclusive system state obtained after merging and reduction into a search sequence structure, and repeatedly performing processes of construction updating and iterative search of the Markov/CCMT system state transition probability mapping matrix model until reaching a specified search depth; and ranking, based on occurrence probabilities of the merged system states, predicted system state scenario sequence dynamic evolution and development, and displaying graphically through an interface to guide safe operation of the system.

It is to be noted that the computer-readable storage medium of this embodiment may be a computer-readable signal medium or a computer-readable storage medium or any combination of the two. The computer-readable storage medium may be, for example, but is not limited to, an electrical, magnetic, optical, electromagnetic, infrared, or semiconductor system, apparatus, or device, or any combination of the above. More specific examples of the computer-readable storage medium may include, but are not limited to: electrical connection via one or more wires, a portable computer disk, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic memory device, or any suitable combination of the above.

In summary, according to the present invention, the system mathematical simulation model and the cell system state space are constructed. The system state and the adjoint parameter of the system state at the initial moment are determined according to the system operation state initial value input or assumption, the initial system state at the initial moment and the adjoint parameter pair of the initial system state are randomly sampled based on Gaussian distribution, and the system simulation model is used to simulate and predict the trajectory change and the final value position point movement and distribution of the sampled particles in the initial system state at the initial moment at different moments. Combined with the actual observation data input of the system operation state, weight calculation and resampling of a particle swarm of system state simulation and prediction points are achieved through the data assimilation algorithm, so as to obtain the posteriori estimation distribution of the assimilated system state and the adjoint parameter of the assimilated system state. The cell structure of the system state space is reconstructed according to the particle swarm distribution of the resampled and assimilated system state, and the assimilated system state is used as the initial system state for subsequent system state scenario behavior deduction and analysis. Meanwhile, the assimilated system state adjoint parameters are subjected to initial averaging to adapt to the normalization and initialization of the particle swarm of the assimilated system state. The probability $P_0$ of the assimilated initial system state at the current moment, the deduction depth K, and the system configuration m' are initially set, the assimilated initial system state at the current moment is added to the search sequence structure, the system states are extracted from the search sequence structure successively, the representative points of the cell space where the current system state is located are randomly sampled through uniform distribution, and trajectory simulation and prediction and statistic analysis are performed on the sampled particle swarm in the current system state on the system simulation model. Based on the statistical distribution of the falling points of the sampled particle swarms of the system states in different cell spaces, estimation of the system state conditional transition probability matrix G at the current moment is achieved by the equal-weight dot product method. The self-updating construction of the system state conditional transition probability matrix Q is achieved by coupling with the system physical equipment state transition probability matrix H. Based on the system state probability mapping matrix model, the system state scenario behavior dynamic evolution analysis algorithm is used to search for the non-zero coincidence elements of the matrix model, and the occurrence probability of the potential transition path sequence of the current system state is obtained by probability multiply-accumulate calculation. After the completion of each iteration deduction search, the same system state points and the transition path sequences of the same system state points are merged, and the occurrence probability of the evolution of the system state is predicted by the probability summation of all transition path sequence branches of the set, under the ownership set. The exclusive system state after the merging and reduction is added to the search sequence structure as a new parent node for the next iterative deduction search until reaching the specified deduction depth K, and assimilation, updating and input of the system state of the next moment are waited for, thereby dynamically deducing and predicting the evolution and development of the system state. By means of the present invention, the adaptive updating construction of the state transition probability matrix of and scenario behavior dynamic deduction and analysis of the large complex digital process control system may be achieved, the problem of search explosions of a high-dimensional system state space is avoided by low-dimensional sparsification of the matrix and the system state data assimilation and intensification, meanwhile, the dynamic behavior characteristics of the system are accurately simulated and mapped by combining with accurate sampling of the system state sampling point movement and distribution based on data assimilation, and the system dynamic reliability prediction and analysis are achieved.

The above description is merely a preferred embodiment of the present invention patent, but the scope of protection of the present invention patent is not limited thereto. All equivalent substitutions or changes made by any person skilled in the art according to the technical solution of the present invention patent and invention ideas thereof within the scope disclosed by the present invention patent belong to the scope of protection of the present invention patent.

What is claimed is:

1. A multi-source data fusion method for dynamic system scenario behavior deduction and reliability prediction analysis, comprising:

obtaining a particle swarm distribution of an assimilated initial system state by Gaussian sampling according to system state initial value input or assumption, importing the particle swarm distribution to a system simulation model to simulate a trajectory change of a particle swarm, obtaining a posteriori distribution of the particle swarm of a system state at the current moment by data assimilation in combination with real-time monitoring input of the system state, and using the posteriori distribution as a particle swarm distribution of an assimilated initial system state at the next moment;

determining, based on a range of the posteriori distribution of the particle swarm of the system state at the current moment obtained during data assimilation, an upper boundary value and a lower boundary value of a system state originating cell, using the upper boundary value and the lower boundary value as a new cell scale for discrete partition of a system state space, and completing reconstruction of a system state space model by digital coding;

performing uniform sampling on the system state originating cell to obtain a distribution of a system dynamic behavior deduction initial state particle swarm, importing the system dynamic behavior deduction initial state particle swarms into the system simulation model to simulate a trajectory change of the extracted particle swarms, obtaining a conditional transition probability matrix of a system state under a current system configuration based on statistical estimation of a number of particle swarms falling into different cells, and obtaining a Markov/CCMT system state transition probability mapping matrix model by combining the conditional transition probability matrix with a system physical component state transition probability matrix;

performing, based on the constructed Markov/CCMT system state transition probability mapping matrix model, system state advance prediction analysis through a system state scenario behavior dynamic deduction algorithm, to further merge the same system states, pushing an exclusive system state obtained after merging and reduction into a search sequence structure, and repeatedly performing processes of construction updating and iterative search of the Markov/CCMT system state transition probability mapping matrix model until reaching a specified search depth; and ranking, based on occurrence probabilities of the merged system states, predicted system state scenario sequence dynamic evolution and development, and displaying graphically through an interface to guide safe operation of the system.

2. The multi-source data fusion method for dynamic system scenario behavior deduction and reliability prediction analysis according to claim 1, wherein a system configuration structure is configured based on system equipment real-time state monitoring input, and the search sequence structure is constructed based on a configured initialized extended system state, wherein the extended system state includes a system state and an adjoint parameter of the system state, a state of the adjoint parameter is an associated system parameter of a change of the system state, and the system state, the adjoint parameter of the system state and a system physical component state are coupled to each other without directly affecting dynamic behavior characteristics of the system, and are indirectly reflected through an influence on the change of the system state.

3. The multi-source data fusion method for dynamic system scenario behavior deduction and reliability prediction analysis according to claim 2, wherein the system state scenario behavior dynamic deduction algorithm comprises:

taking the assimilated system state at the current moment and an adjoint parameter of the assimilated system state as a system state originating point, adding the system state originating point to the search sequence structure, and meanwhile, initializing parameters of a probability of an initial system state, a search depth, a time step;

extracting system states in the search sequence structure one by one, searching for non-zero elements in the Markov/CCMT system state transition probability mapping matrix model subjected to assimilation and update of the system state to obtain the next transition point of the system state, an occurrence probability of a transition sequence path of each system state being obtained by probability calculation in the search process, and setting a pre-truncation criterion during transition of each step of the system state as needed;

after each traversal of the system states in the search sequence structure is completed, merging system state transition sequence paths with the same final state, and adding a merged system state to the search sequence structure as a new parent node for the next iterative search; and for each new parent node, reconstructing the Markov/CCMT system state transition probability mapping matrix model by Monte Carlo system state cell representative point random sampling, simulation and statistical analysis before proceeding to the next branch search of the system state transition sequence, so as to respond to a change of the adjoint parameter.

4. The multi-source data fusion method for dynamic system scenario behavior deduction and reliability prediction analysis according to claim 3, wherein according to the system state scenario behavior dynamic deduction algorithm, the same system state points are concentrated and merged after each iterative search step, thereby avoiding an exponential growth of a number of branches in a system state sequence during each iteration, preventing the number of the system state points from exceeding a size of a whole system state space, effectively reducing a system state search space, and significantly improving a search efficiency.

5. The multi-source data fusion method for dynamic system scenario behavior deduction and reliability prediction analysis according to claim 3, wherein during system state scenario behavior dynamic deduction, a potential transition of system states after each assimilation is subjected to evolution and development, and the occurrence probability of different system states after evolution is obtained by cumulative probability summation during each matrix iterative search, so as to achieve dynamic system reliability prediction analysis, comprising:

ranking predicted system states obtained from each iterative search by occurrence probabilities of the predicted system states through a list, wherein the greater a probability value, the greater the occurrence possibility of a system state; and transforming digital coding system state vectors subjected to integration and ranking in each search step into a common language description that can be understood by system operators, demonstrating a dynamic evolution process of the system states through a human-machine interface, and meanwhile, comparing the obtained system state failure probabilities with a system operation safety limit acceptable guideline to guide the safe operation of the system.

6. The multi-source data fusion method for dynamic system scenario behavior deduction and reliability prediction analysis according to claim 1, wherein for a complex nonlinear process control system, accurate analytical solutions are difficult to be obtained for the conditional transition probability matrix, and the system state transition probability mapping matrix model is obtained by statistical analysis of system state migration trajectory simulation and tracing through a system state sampling point movement and distribution accurate sampling method based on Monte Carlo simulation.

7. The multi-source data fusion method for dynamic system scenario behavior deduction and reliability prediction analysis according to claim 6, wherein the system state sampling point movement and distribution accurate sampling method comprises:

determining, in combination with a particle filter-based data assimilation process, a initial system state position through system state monitoring input or assumption at an initial moment, performing Gaussian sampling on initial system state position points, and generating N particles around the system states and each variable in the adjoint parameter of the system states, the initial system state position points including the adjoint parameter of the initial system state position points;

importing the system states of and the adjoint parameters of the system states of sampled particles into the system simulation model to simulate and predict a particle trajectory change and a final value distribution of the particles;

reading system real-time state observation data, and completing weight value calculation and resampling of the simulated and predicted particles through a particle filter-based data assimilation algorithm; and reconstructing the system state space based on movement and distribution of the particle swarm after resampling, so as to simulate and reflect the system dynamic behavior characteristics more accurately.

8. The multi-source data fusion method for dynamic system scenario behavior deduction and reliability prediction analysis according to claim 1, wherein the method further comprises a self-updating construction process of the Markov/CCMT system state transition probability mapping matrix model, system state scenario behavior fast deduction and dynamic reliability prediction analysis are realized by searching for coincidence elements in a potential transition mapping relationship sub-matrix of the current system state and integrating the same system states, comprising updating of the system physical component state transition probability matrix and updating of the conditional transition probability matrix, wherein for the updating of the system physical component state transition probability matrix, system equipment actual state monitoring is taken as input, and an irrelevant system configuration of the system physical component state transition probability matrix and a state transition mapping relationship of the irrelevant system configuration are subjected to annihilation and sparsification;

for the updating of the conditional transition probability matrix, system equipment actual state monitoring and system process variable state monitoring are taken as input, particle swarm uniform sampling is performed on a cell space where the assimilated and updated initial system state is located, and a particle swarm trajectory change is simulated on the system simulation model, a distribution of particle final value positions in the different cell spaces is counted, and a conditional transition probability of a system state under the current system configuration is approximatively estimated and updated by an equal-weight dot product method; and while completing the self-updating construction of the system state transition probability mapping matrix of this cycle, system state adjoint parameters of different falling cell representative points obtained from random sampling and simulated statistical analysis in the iterative search step of the cycle are averaged to adapt to reconstruction of the Markov/CCMT system state transition probability mapping matrix model in the next iterative search.

9. The multi-source data fusion method for dynamic system scenario behavior deduction and reliability prediction analysis according to claim 8, wherein a dynamic search range of the Markov/CCMT system state transition probability mapping matrix model Q is only limited to the potential transition mapping relationship sub-matrix of the current system state, that is, in the self-updating construction process of the Markov/CCMT system state transition probability mapping matrix model Q, only the conditional transition probability of the system state under the current system configuration is considered, and a conditional transition probability between other system states is automatically assigned to be 0, thereby reducing the complexity of the construction of the conditional transition probability matrix G, and only traversing and storing non-zero elements in the search process to improve a search speed.

10. A multi-source data fusion system for dynamic system scenario behavior deduction and reliability prediction analysis, comprising:

a particle swarm distribution acquiring module, configured to: obtain, based on a system state spatio-temporal coupling model, a particle swarm distribution of an assimilated initial system state by Gaussian sampling according to system state initial value input or assumption, import the particle swarm distribution to a system simulation model to simulate a trajectory change of a particle swarm, obtain a posteriori distribution of a system state particle swarm at the current moment by data assimilation in combination with a real-time monitoring input of a system state, and use the posteriori distribution as a particle swarm distribution of an assimilated initial system state at the next moment;

a system state space model reconstruction module, configured to: determine, based on a range of the posteriori distribution of the system state particle swarm at the current moment obtained during data assimilation, an upper boundary value and a lower boundary value of a system state originating cell, use the upper boundary value and the lower boundary value as a new cell scale for discrete partition of a system state space, and complete reconstruction of a system state space model by digital coding;

a Markov/CCMT system state transition probability mapping matrix model generation module, configured to: perform uniform sampling on the system state originating cell to obtain a distribution of a system dynamic behavior deduction initial state particle swarm, import the system dynamic behavior deduction initial state particle swarm into the system simulation model to simulate a trajectory change of the extracted particle swarm, obtain a conditional transition probability matrix of a system state under a current system configuration based on statistical estimation of a number of particle swarms falling into different cells, and obtain a Markov/CCMT system state transition probability mapping matrix model by combining the conditional transition probability matrix with a system physical component state transition probability matrix;

a system state scenario behavior dynamic deduction algorithm and reliability prediction analysis module, configured to: perform, based on the constructed Markov/CCMT system state transition probability mapping matrix model, system state advance prediction analysis through applying a system state scenario behavior dynamic deduction algorithm, to further merge the same system states, push an exclusive system state obtained after merging and reduction into a search sequence structure, and repeatedly perform processes of construction, updating and iterative search of the Markov/CCMT system state transition probability mapping matrix model until reaching a specified search depth; and a system analysis result displaying module, configured to rank, based on the occurrence probabilities of the merged system states, predicted system state scenario sequence dynamic evolution and development, and display graphically through an interface to guide safe operation of the system.

11. The multi-source data fusion method for dynamic system scenario behavior deduction and reliability prediction analysis according to claim 2, wherein, for a complex nonlinear process control system, accurate analytical solutions are difficult to be obtained for the conditional transition probability matrix, and the system state transition probability mapping matrix model is obtained by statistical analysis of system state migration trajectory simulation and tracing through a system state sampling point movement and distribution accurate sampling method based on Monte Carlo simulation.

12. The multi-source data fusion method for dynamic system scenario behavior deduction and reliability prediction analysis according to claim 3, wherein, for a complex nonlinear process control system, accurate analytical solutions are difficult to be obtained for the conditional transition probability matrix, and the system state transition probability mapping matrix model is obtained by statistical analysis of system state migration trajectory simulation and tracing through a system state sampling point movement and distribution accurate sampling method based on Monte Carlo simulation.

13. The multi-source data fusion method for dynamic system scenario behavior deduction and reliability prediction analysis according to claim 4, wherein, for a complex nonlinear process control system, accurate analytical solutions are difficult to be obtained for the conditional transition probability matrix, and the system state transition probability mapping matrix model is obtained by statistical analysis of system state migration trajectory simulation and tracing through a system state sampling point movement and distribution accurate sampling method based on Monte Carlo simulation.

14. The multi-source data fusion method for dynamic system scenario behavior deduction and reliability prediction analysis according to claim 5, wherein, for a complex nonlinear process control system, accurate analytical solutions are difficult to be obtained for the conditional transition probability matrix, and the system state transition probability mapping matrix model is obtained by statistical analysis of system state migration trajectory simulation and tracing through a system state sampling point movement and distribution accurate sampling method based on Monte Carlo simulation.

* * * * *